(12) United States Patent
Paulsen et al.

(10) Patent No.: US 7,695,649 B2
(45) Date of Patent: Apr. 13, 2010

(54) LITHIUM TRANSITION METAL OXIDE WITH GRADIENT OF METAL COMPOSITION

(75) Inventors: Jens Martin Paulsen, Ngatea (NZ); Ki Young Lee, Daejeon (KR); Joon Sung Bae, Daejeon (KR); Mun Ju Kim, Seoul (KR)

(73) Assignee: LG Chem, Ltd. (KR)

( * ) Notice: Subject to any disclaimer, the term of this patent is extended or adjusted under 35 U.S.C. 154(b) by 1292 days.

(21) Appl. No.: 10/533,496

(22) PCT Filed: Oct. 30, 2003

(86) PCT No.: PCT/KR03/02304

§ 371 (c)(1),
(2), (4) Date: Apr. 29, 2005

(87) PCT Pub. No.: WO2004/040677

PCT Pub. Date: May 13, 2004

(65) Prior Publication Data

US 2006/0105239 A1    May 18, 2006

(30) Foreign Application Priority Data

Oct. 31, 2002    (NZ)    ..................... 520452

(51) Int. Cl.
*H01B 1/00*    (2006.01)
(52) U.S. Cl. .............. 252/518.1; 252/182.1; 252/519.1; 264/446; 264/447; 423/594.15; 423/594.3; 423/594.4; 423/599; 427/214; 427/215; 428/357; 428/402; 428/403; 429/218.1; 429/223; 429/224; 429/231.1; 429/231.4; 429/231.6; 429/231.95

(58) Field of Classification Search .............. 252/519.1, 252/182.1, 500, 518.1, 521.2; 429/323, 324, 429/594.15, 594.4, 218.1, 223, 224, 231.1, 429/231.4, 231.6, 231.95; 264/446, 447; 423/594.15, 594.3, 594.4, 599; 427/214, 427/215; 428/357, 402, 403

See application file for complete search history.

(56) References Cited

U.S. PATENT DOCUMENTS 5,264,201 A * 11/1993 Dahn et al. ............... 252/519.1

(Continued)

FOREIGN PATENT DOCUMENTS

EP    1189296    3/2002

(Continued)

OTHER PUBLICATIONS

"Manganese and Lithium-Rich Layered Cathode Materials"; Authors: Paulsen & Ammundsen, 11th International Meeting on Lithium Batteries (IMLB 11), Cathodes II, Ilion/Pacific Lithium.

(Continued)

*Primary Examiner*—Mark Kopec
*Assistant Examiner*—Khanh Tuan Nguyen
(74) *Attorney, Agent, or Firm*—Cantor Colburn LLP

(57) ABSTRACT

Disclosed are primary materials, precursor materials and final materials as well as methods to prepare these materials. The final materials are mixed lithium transition metal oxides, useful as performance optimized cathode materials for rechargeable lithium batteries. The transition metal is a solid solution mixture of manganese, nickel and cobalt, M=(Mn1-uNiu)1-u-yCoy, with 0.2.

16 Claims, 12 Drawing Sheets

U.S. PATENT DOCUMENTS

| | | | |
|---|---|---|---|
| 5,340,670 | A | 8/1994 | Takami et al. |
| 5,626,635 | A | 5/1997 | Yamaura et al. |
| 5,718,989 | A * | 2/1998 | Aoki et al. .................. 429/223 |
| 6,040,090 | A | 3/2000 | Sunagawa et al. |
| 6,241,959 | B1 * | 6/2001 | Cho et al. ................ 423/594.4 |
| 6,274,273 | B1 | 8/2001 | Cho et al. |
| 6,416,903 | B1 * | 7/2002 | Fierro et al. ................ 429/223 |
| 6,458,487 | B1 * | 10/2002 | Takeuchi et al. ............ 429/224 |
| 6,555,269 | B2 * | 4/2003 | Cho et al. ................ 429/231.1 |
| 6,875,416 | B1 * | 4/2005 | Benz et al. ............. 423/594.15 |
| 2002/0071990 | A1 * | 6/2002 | Kweon et al. ............ 429/231.1 |
| 2002/0110518 | A1 * | 8/2002 | Okuda et al. ................ 423/594 |
| 2002/0192552 | A1 * | 12/2002 | Lampe-Onnerud et al. .. 429/223 |
| 2003/0027048 | A1 | 2/2003 | Lu et al. |
| 2003/0108793 | A1 | 6/2003 | Dahn et al. |

FOREIGN PATENT DOCUMENTS

| | | | |
|---|---|---|---|
| JP | 04-087152 | | 3/1992 |
| JP | 07-235292 | | 9/1995 |
| JP | 08-162114 | | 6/1996 |
| JP | 09-035715 | | 2/1997 |
| JP | 09-050810 | | 2/1997 |
| JP | 10-236826 | | 9/1998 |
| JP | 11-071114 | | 3/1999 |
| JP | 11-092119 | * | 4/1999 |
| JP | 2000-164214 | | 6/2000 |
| JP | 2001-348224 | | 12/2001 |
| JP | 2002-145623 | * | 5/2002 |
| JP | 2002-170563 | | 6/2002 |
| KR | 1020010096191 | | 11/2001 |
| WO | 0141238 | | 6/2001 |

OTHER PUBLICATIONS

"LiNin2Mn2O2: Possible Alternative to LiCoO2 for Lithium-ion Batteries"; Authors: Makimura & Ohzuku, Proceedings of the 41st battery symposium on 2D20 and 2D21, Nagoya, Japan 2000.

"Novel lithium insertion material of LiCo1/3Ni1/3Mn1/3O2 for advanced lithium-ion batteries"; Authors: N. Yabuuchi, T. Ohzuku, J. of Power sources 2003.

"Morphology and Safety of Li[niXCo1-2xMnx]O2" Authors: S. Jouanneau et al., J. Electrochem. Soc. 150, A1299, 2003.

"The Effect of Al2O3 Coating on the cycle Life Performance in Thin-Film LiCoO2 Cathodes"; Authors: Y. J. Kim et al., J. Electrochem. Soc. 149 A1337.

"Effect of Al2O3-Coated o-LiMnO2 Cathodes Prepared at Various Temperatures on the 55C Cycling behavior"; Authors: Cho et al., J. Electrochem. Soc. 149 A127.

"The Effect of a Metal-Oxide Coating on the Cycling Behavior at 55C in Orthorhombic LiMnO2 Cathode Materials"; Authors: J. Cho et al., J. Electrochem. Soc. 149 A288.

"Staging Phase Transitions in LixCoO2"; Authors: Z. Chen et al., J. Electrochem. Soc. 149 A1604.

"Effect of a ZrO2 Coating on the Structure and Electrochemistry of LixCoO2 When Cycled to 4.5 V" Authors: Z. Chen, J. Dahn, Electrochem. and solid-state letters, 5, A213 (2002).

"Studies of LiCoO2 Coated with Metal Oxides" Authors: Z. Chen, J. Dahn, Electrochem. and solid-state letters, 6, A221 (2003).

"Improvement of Structural of LiMn2O4 Cathode Material on 55C Cycling by Sol-Gel Coating of LiCoO2" Authors: J. Cho et al., Electrochem. and solid-state letters, 2, 607 (1999).

"Enhancement of Thermal Stability of LiCoO2 by LiMn2O4 Coating" Authors J. Cho and G. Kim, Electrochem. and solid-state letters, 2, 253 (1999).

"LiCoO2 Cathode Material That Does Not Show a Phase Transition from Hexagonal to Monoclinic Phase"; Authors: J. Cho et al., J. Electrochem. Soc. 148 A1110 (2001).

"Improvement of Structural Stability of LiCoO2 Cathode during Electrochemical Cycling by Sol-Gel of SnO2": Authors: J. Cho et al., Electrochem. and solid-state letters, 3, 362, (2000).

"Electrochemical Evaluation and Structural Characterization of Commercial LiCoO2 Surfaces Modified with MgO for Lithium-Ion Batteries"; Authors: J. Cho et al., Electrochem. and solid-state letters, 4, A149 (2002),.

"Direct micron-sized LiMn2O4 particle coating on LiCoO2 cathode material material using surfactant"; Author: J. Cho; Solid State Ionics, 160 (2003), 241-245.

"Why bother coating LiCoO2"; Authors: Z. Chen, J. Dahn; Abs 329, 204th ECS Meeting, Orlando.

"High-Performance ZrO2-Coated LiNiO2 Cathode Material"; Authors: J. Cho et al., Electrochem. and solid-state letters, 4, A159 (2001).

* cited by examiner

LITHIUM TRANSITION METAL OXIDE WITH GRADIENT OF METAL COMPOSITION

TECHNICAL FIELD

This invention relates to non-uniform, powderous materials, to the process to prepare such materials, and to electrochemical cells, containing such materials. The objective of the invention are to provide powderous materials, comprising at least 85% w/w of transition metal and oxide, like transition metal oxides, lithium transition metal oxides, transition metal hydroxides, oxohydroxides, carbonates etc, characterized by having a significantly different transition metal composition at the outer bulk and the inner bulk.

A typical application of the non-uniform lithium transition metal oxide is an active cathode material in a rechargeable lithium battery. It allows for improved electrochemical properties like high rate performance and energy density and improved safety properties at low cost.

The non-uniform transition metal hydroxides, carbonates, oxohydroxides etc. are typically applied as primary materials or as precursor materials to prepare the non-uniform lithium transition metal oxide.

The process to prepare the primary materials is a coprecipitation reaction, where the precipitate covers the surface of seed particles, and the transition metal composition of the precipitate differs significantly from the composition of the seed particles.

The materials of this invention are lithium metal oxides, metal oxides, metal oxohydroxides, metal carbonates etc. where the metal dominantly, to at least 90-95%, is a solid state mixed solution of transition metal, for example comprising manganese, nickel and cobalt. A preferred averaged composition of the transition metal is $M=(Mn_uNi_{1-u})_{1-y}Co_y$, $0.2 \leq u \leq 0.7$ and $0.1<y<0.9$. The transition metal composition of a typical single particle is non-uniform. It has significantly different transition metal stoichiometries in the inner bulk (near to the center of the particle) and in the outer bulk (near to the surface). The stoichiometry of manganese as well as nickel as well as cobalt changes significantly by at least 10%, preferable 15%.

One implementation of the non-uniform powderous material are lithium transition metal oxides, in a preferred implementation the lithium transition metal oxides have a layered ordered rocksalt type crystal structure. They are applied as cathodes in rechargeable lithium batteries. Non-uniform Lithium transition metal oxides are better performance optimized by paying respect to different requirements for inner bulk, outer bulk and surface. Preferable, the spatial transition metal stoichiometry changes smoothly between surface and inner bulk.

A second implementation of non-uniform powderous materials are precursor materials like transition metal carbonates, oxides or oxohydroxides. The non-uniform performance optimized lithium transition metal oxide is prepared from such precursor material by solid state reaction with a source of lithium. The precursor material has a significantly different manganese, as well as nickel a s well as cobalt stoichiometry at the outer and inner bulk. The precursor material may contain further ions like sulfate, chloride, fluorite, sodium or potassium. During the reaction the ions can transform to form sintering aids.

A third implementation are primary materials like transition metal hydroxides or carbonates. The primary material additionally may contain further anions or cations. The precursor materials are prepared from primary materials by drying or heating or alternatively, by drying or heating after an appropriate ion exchange process to modify or remove anions. The primary materials have the same non-uniform transition metal composition as the precursor materials.

The primary materials are prepared by a precipitation reaction, during which a transition metal containing precipitate is precipitated onto the surface of particles, which act as seeds. The transition metal composition of manganese, nickel and cobalt of the seed particles and of the precipitate differs significantly by at least 10%, preferable by at least 15%. The process delivers a slurry, containing the powderous primary material.

BACKGROUND ART

State of art cathode material for rechargeable lithium batteries are transition metal oxides with layered crystal structure (r-3m) like $LiCoO_2$, $LiNiO_2$, $LiCo_xNi_{1-x}O_2$, doped $LiCo_xNi_{1-x}O_2$ (using dopands like Al, Mn, $Mn_{1/2}Ni_{1/2}$, Mg, $Ti_{1/2}Mg_{1/2}$), $LiNi_{1/3}Mn_{1/3}Co_{1/3}O_2$, $Li(Ni_{1/2}Mn_{1/2})_{1-x}Co_xO_2$, $Li_{1+x}M_{1-x}O_2$ ($M=Mn_{1-y}Ni_y$), $LiCo_{1-x}(Ni_{1/2}Mn_{1/2})_xO_2$ etc. Generally these materials are powders. These materials have different properties, but generally the composition in the outer bulk near to the surface of a particle is the same as the composition in the inner bulk, near to the center of the particle. Much work has been spent to optimize the composition and morphology for such cathode material. This approach can be summarized as the "uniform approach". "Uniform" cathode materials have a composition, which is the same in the outer and inner bulk. A uniform composition can be simple (like Co in $LiCoO_2$) or complex. Recent disclosures show that lithium transition metal oxides with complex metal composition have improved properties. Complex lithium transition metal oxides are described in various patents, without claim for completeness a few will be mentioned.

PCT—WO141238 A1 (Paul Scherrer Institute, Swizterland) with priority Dec. 3, 1999 describes complex materials basing on doped $LiNi_{1/2}Mn_{1/2}O_2$, prepared from precipitated precursors.

U.S. Pat. No. 5,626,635 (Matsushita) describes $LiNiO_2$ doped by Mn or Co.

U.S. Pat. No. 6,040,090 (Sanyo) describes materials having a certain X-ray diffraction feature. The patent covers a very wide selection of doped $LiNiO_2$, where dopands are Mn, Co, Al etc. The patent claims also include complex materials, with composition $Li_xMO_2$, where M is $(Ni_{1/2}Mn_{1/2})_{1-x}Co_x$.

EP1 189 296 A2 (Ilion) with priority Mar. 9, 2001 claims lithium rich materials $Li_{1+x}M_{1-x}O_2$ with $M=(Mn_{1-u}Ni_u)_{1-y}Co_y$ with $u \cong 0.5$, $x>0$ and $y<\frac{1}{3}$.

US20030108793 and US20030027048 (3M) with later priority (Aug. 7, Apr. 27, 2001) claim an extremely wide range of solid state solutions within the quaternary system $LiCoO_2$—$LiNi_{1/2}Mn_{1/2}O_2$—$Li[Li_{1/2}Mn_{2/3}]O_2$—$LiNi_{1/2}Mn_{1/2}O_2$, but eventually focusing on materials which are solid state solutions of $Li[Li_{1/2}Mn_{2/3}]O_2$ with $LiNi_{1/2}Mn_{1/2}O_2$ or solid state solutions of $LiCoO_2$— with $LiNi_{1/2}Mn_{1/2}O_2$.

Excellent results of complex cathode materials were reported: Examples are materials like $Li[Li_xM_{1-x}]O_2$ with $x \cong 0.05$ and $M=(Mn_{1/2}Ni_{1/2})_{5/6}Co_{1/6}$ (Paulsen&Ammundsen, 11th International Meeting on Lithium Batteries (IMLB 11), Cathodes II, Ilion/Pacific Lithium), $LiNi_{1/3}Mn_{1/3}Co_{1/3}O_2$ as demonstrated by Ohzuku (Makimura&Ohzuku, Proceedings of the 41$^{st}$ battery symposium on 2D20 and 2D21, Nagoya, Japan 2000 or N. Yabuuchi, T. Ohzuku, J. of Power sources 2003, (in print) ) or doped $LiCoO_2$ demonstrated by Prof. Dahn's group (S. Jouanneau et all., J. Electrochem. Soc. 150, A1299, 2003).

Generally, the optimum of all uniform compositions is a compromise between many different requirements, like cost, processing and performance/properties. These requirements cannot be met simultaneously. This is because the requirements for the inner bulk, the outer bulk and the surface of the particle are different. Consequently, conventional materials with a uniform stoichiometry do not represent the optimum regarding cost, processing and properties, and as a general conclusion, materials with uniform composition are not fully optimized.

Previously, some work, usually called "surface coating", has been spent to engineer cathode materials. The coating approach is for example described by Y. J. Kim et all., J. Electrochem. Soc. 149 A1337, J. Cho et all., J. Electrochem. Soc. 149 A127, J. Cho et all., J. Electrochem. Soc. 149 A288, Z. Chen et all., J. Electrochem. Soc. 149 Al 604, Z. Chen, J. Dahn, Electrochem. and solid-state letters, 5, A213 (2002), Z. Chen, J. Dahn, Electrochem. and solid-state letters, 6, A221 (2003), J. Cho et all., Electrochem. and solid-state letters, 2, 607 (1999), J. Cho and G. Kim, Electrochem. and solid-state letters, 2, 253 (1999), J. Cho et all., J. Electrochem. Soc. 148 A 1110 (2001), J. Cho et all., Electrochem. and solid-state letters, 3, 362, (2000), J. Cho et all., Electrochem. and solid-state letters, 4, A159, (2001), Z. Whang et all., J. Electrochem. Soc. 149, A466 (2002), J. Cho, Solid State Ionics, 160 (2003) 241-245.

In the surface coating literature, a small amount of a compound M2 is coated onto the surface of particles having the composition M1, usually followed by a heat treatment. Depending on the choice of M2 and M1, and depending on preparation conditions, two extreme cases exist: Case 1: A very thin layer around the particle has a significantly different stoichiometry than the bulk of the particle. Case 2: An extended region at the outside of the particle has a small change of stoichiometry.

To achieve performance optimized materials, it is however required, that both the change of stoichiometry is significant, as well as that the regions with different stoichiometry are extended.

A cathode material, usually with layered crystal structure (preferred $LiCoO_2$) was coated by a gel, containing another metal, followed by a mild heat treatment. Metals of choice were Al, Sn, Zr, Mg, Mn, Co. In most cases, no solid state solution between $LiCoO_2$ and the metal exist, so that the surface is partially or completely coated by a localized second phase, showing phase boundaries, and a steep change of stoichiometry across the boundary. The composition of inner bulk and outer bulk is the same. In some cases a solid state solution between the $Li_xMO_2$ cathode and the coating metal exist. In this case a gradient of composition of the coated metal is achieved. However, generally, only small or very small amount of the metal were coated, not exceeding about 0.03 mol or less coating metal per 1 mol of $Li_xMO_2$ cathode. As a result the composition M1, M2 in the inner bulk and the outer bulk differ significantly only for the coating metal composition, but not significantly (<10%) for the bulk transition metal.

Typical coated cathode particles are covered by a very thin, often incomplete surface of a metal oxide phase with a sharp phase boundary. It is discussed in the literature, that the coating prevents the contact of electrolyte with cathode, thus hindering unwanted side reactions. During charge-discharge, a cathode like $LiCoO_2$ expands and contracts. It is speculated that a "hard" surface could mechanically prevent the expansion-contraction, thus limiting the strain within the bulk, and causing better cycling stability. In this case a thin coating layer with relatively sharp interface between bulk and coating layer will experience significant local strain. A thin surface cannot accompany this strain, resulting in cracks, or loss of mechanical contact, thus making the coating layer less efficient. Additionally the coating material might be electrochemically inert, not contributing to the charge capacity of the cathode material. The surface layer of coated cathode powders is typically formed by a separated "wet" sol-gel step, followed by a mild heating. Sol gel technology is expensive, thus increasing the cost.

It also needs to be mentioned that the effectiveness of the coating is severe questioned. Recent publications by J. Dahns group (Z. Chen, J. Dahn, Electrochem. and solid-state letters, 6, A221 (2003) and Z. Chen, J. Dahn, Abs 329, 204th ECS Meeting, Orlando) show that not the coating, but rather the heat treatment of $LiCoO_2$ is responsible for the observed performance improvement.

From a general point of view, coated cathode materials are not fully optimized. It is not sufficient to distinguish between different requirements for bulk and surface properties only, for a full optimization it is also required to optimize the cathode for different requirements for the properties in the inner bulk, the outer bulk and at the surface.

The actual invention is instead focusing on materials with significantly different transition metal stoichimetry in the inner bulk, outer bulk and surface. In cathode materials of this invention, the transition metal stoichimetry changes smoothly over an extended region of the particle. In cathode materials of this invention, the outer bulk expands or contracts in a similar way as the inner bulk. Therefore mechanical integrity is guaranteed. Furthermore, the modified layer is electrochemically active, therefore no capacity of the cathode is lost.

U.S. Pat. No. 6,555,269 (J. Cho et all., submitted by Samsung) describes $LiCoO_2$ coated by metal selected from Al, Mg, Sn, Ca, Ti, Mn. The coating is made by sol-gel technique, followed by a mild heat treatment at 150-500° C. The maximum amount of metal per Co is 6%. The final cathode does not contain nickel. Furthermore, Ca and Sn (and probably Mg) do not form solid state solutions with $LiCoO_2$. Manganese and titanium only form solid state solutions if fully lithiated to $Li_2TiO_3$ and $Li_2MnO_3$. This approach does not achieve a Mn—Ni—Co based material as described in the actual invention, where the manganese composition, as well as cobalt composition as well as nickel composition of inner bulk and outer bulk change significantly. Particularly, particles having a layered crystal structure and with smooth but significant spatial change of stoichiometry are not achieved.

U.S. Pat. No. 6,274,273 (J. Cho et all., submitted by Samsung) describes a an active material, being lithium manganese spinel, coated by cobalt, thus establishing a concentration gradient of cobalt. The cathode material is prepared coating the spinel by sol-gel, followed by a heat treatment below 850° C. The amount of Co (per Mn) is limited to below 5%. Only very small stoichiometric changes of the base manganese are achieved. FIG. 5a for example would lead to the conclusion, that the manganese stoichiometry only varies by about 1%, ranging from 0.963 at the surface to about 0.973 in the center of the particle. Neither the starting lithium manganese oxide nor the coating metal contain nickel. This approach does not deliver a Mn—Co—Ni material according the present invention, and having a significant change of manganese, nickel and cobalt stoichiometry.

J. Cho, Solid State Ionics, 160 (2003) 241-245 describes the coating of $LiCoO_2$ by Li—Mn spinel particles. Basically a slurry, containing balhmilled microsized spinel is added to a slurry containing $LiCoO_2$. The final material does not contain nickel. It is questionable, if a thick coating can be achieved by the described method. In the beginning, spinel might be coated onto the surface of $LiCoO_2$. But, as soon as the surface is covered by spinel, further coating of spinel would require the attachment of spinel particles to the spinel covered surface of the $LiCoO_2$. This attachment, however, is not limited to the surface of $LiCoO_2$ particles, it will also cause an uncontrolled agglomeration of spinel particles. As a result, either the surface is thin, or only partially coated, or significant agglomerates of spinel, without $LiCoO_2$ core will be present. In fact, FIG. 1 shows different types of particles and indicates that a significant fraction of the particles are agglomerates of spinel without $LiCoO_2$ core.

Some patents describe cathode materials with non-uniform composition. Improved electrochemical properties are for example reported for mixtures of $LiNi_{1-x}Co_xO_2$ and lithium manganese spinel. These cathodes are however uniform (i.e. not non-uniform) in the sense of the actual invention because particles have the same composition in the outer and inner bulk.

DISCLOSURE OF THE INVENTION

The present invention is directed to a lithium transition metal oxide with gradient of metal composition that substantially obviates one or more problems due to the limitations and disadvantages of the prior art.

It is an object of the present invention to provide non-uniform, powderous materials, to the process to prepare such materials, and to electrochemical cells, containing such materials.

It is another object of the present invention to provide powderous materials which have a significantly different transition metal composition at the outer bulk and the inner bulk.

To achieve these objects and other advantages and in accordance with the purpose of the invention, as embodied and broadly described herein, there is provided a powderous transition metal compound comprising at least 85% w/w of transition metal and oxygen, wherein the powder consists of particles which have a significant spatial change of transition metal stoichiometry, where the average transition metal compositions in the outer bulk differ by at least 10% from the average transition metal compositions of the inner bulk, the inner bulk being specified as a region around the center of the particle containing about 50% of the total number of transition metal atoms of the particle.

In another aspect of the present invention, there is provided a powderous lithium metal oxide, wherein at least 90% of the metal is transition metal with average composition $M=(Mn_{1-u}Ni_u)_{1-y-z}Co_y$, where $0.4<u<0.65$ and $0.2<y<0.9$, the powder consisting of particles which have the same layered crystal structure with space group r-3m everywhere in the bulk of typical particles, a significant spatial change of transition metal stoichiometry, where the average transition metal compositions of cobalt as well as manganese as well as nickel in the outer bulk differ by at least 10% from the average transition metal compositions of the inner bulk, the inner bulk being specified as a region around the center of the particle containing about 50% of the total number of cobalt, nickel and manganese atoms of the particle.

In still another aspect of the present invention, there is provided a method for preparing powderous transition metal compounds, comprising at least one precipitation reaction, wherein at least one solution of dissolved transition metal salt and at least one solution of dissolved hydroxide of carbonate salts are added to particles acting as seeds; dissolved transition metal cations and dissolved hydroxide or carbonate anions form a solid precipitate; and the precipitate forms a layer covering the seed particles, the precipitate having a transition metal composition M2, which differs from the composition M1 of the seed particles by at least 10%.

In still another aspect of the present invention, there is provided a method for preparing powderous lithium transition metal compounds, comprising steps of at least one precipitation reaction according any one of the claims 9 to 14, a heat treatment between 110-350° C. to modify the precipitate, and a solid state reaction of the modified precipitate with a source of lithium.

BEST MODE FOR CARRYING OUT THE INVENTION

Figure 1:
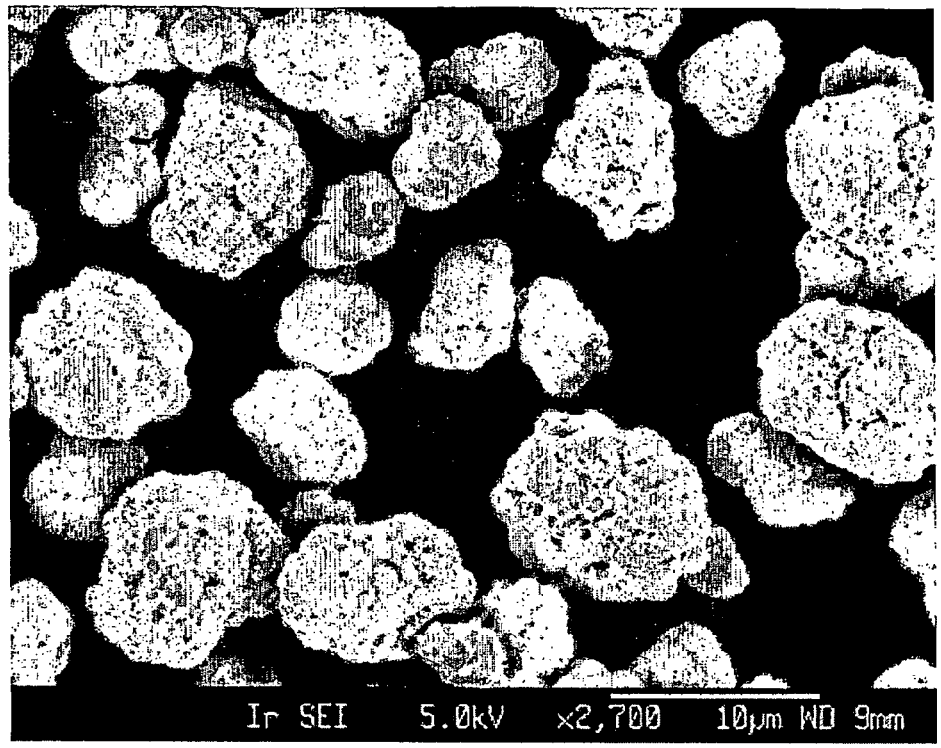
FIG. 1 shows a FESEM micrograph of MOOH ($M=Mn_{1/2}Ni_{1/2}$) seeds prepared by co-precipitation of $MSO_4$ with NaOH according to Example 0.1.
Figure 1:
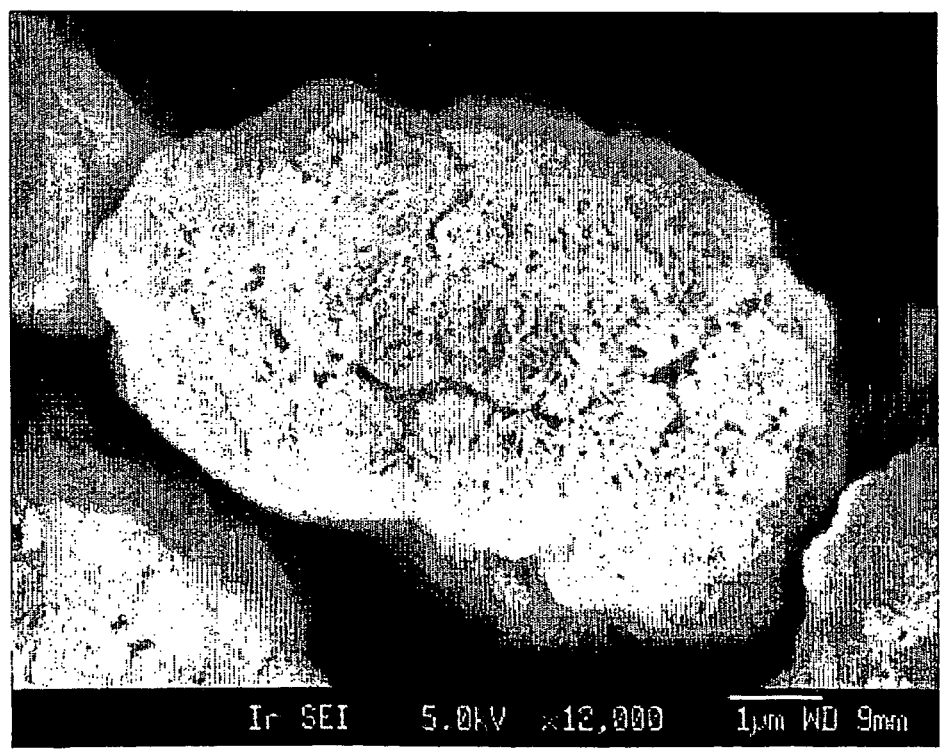

The present invention supplies a cathode material which solves the before mentioned limitations. The cathode material is better optimized because it is taken care for different requirements for surface, outer bulk (near to the surface) and inner bulk (in the inside of the particle). Particularly, cathodes can be achieved which are better optimized in respect to cost, power density, energy density, cycling stability and safety.

$LiCoO_2$ is a good cathode material in terms of rate performance and powder density. It has a high solid state Li-ion diffusion constant. The Li-ion diffusion constant determines the maximum size of dense primary particles. If these are too large, the diffusion path increases, as does the typical time of diffusion. $LiCoO_2$ has a large diffusion constant, and a sufficient electronic conductivity. Therefore larger dense primary particles are possible, still allowing for a sufficient rate performance. Larger dense primary particles allow to achieve powders with high packing density, allowing a high electrode density which is required to achieve a high energy density. $LiCoO_2$ however, shows poor cycling stability if charged to high voltage.

Compared to $LiCoO_2$, cathode materials, like $Li[(Ni_{1/2}Mn_{1/2})_{1-x}Co_x]O_2$, especially if the Co content is low, tend to have a lower kinetics of the lithium transport by diffusion in the solid phase, and lower electronic conductivity. $LiCoO_2$ with a low BET surface area ($<0.2$ $m^2/g$) still support high rates, whereas $LiNi_{1/2}Mn_{1/2}O_2$ based materials with low surface area do not, apparently this phenomena is related to the lower lithium-diffusion kinetics. The conventional approach to optimize $LiNi_{1/2}Mn_{1/2}O_2$ based materials is to allow a larger BET surface area, resulting in shorter diffusion lengths and a better rate performance. This approach however makes it difficult to obtain materials with a sufficient high pressed density, as a result the electrode density is insufficient. Another approach would be an increase of cobalt stoichiometry to improve the lithium diffusion kinetics. It might however be desired to keep materials cost low, for example by reducing the cobalt stoichiometry. An optimized cathode material with low Co content has a transition metal gradient, with increasing cobalt composition towards the outside of the particle, as will be discussed in the following. Such a material has different transition metal compositions M1, M2 and M3 at the surface, in the outer bulk and in the inner bulk, respectively. The cobalt as well as manganese as well as nickel stoichiometry in outer bulk and inner bulk change by at least 10%, preferable 15%.

It is desirable to have a good Lithium transport kinetics on the outside of particles. At the inside of particles a lower transport kinetic can be tolerated because the Li-ionic current density is lower at the inside. (The transport rates of lithium during cycling reduce from the outside to the inside of particles, finally reaching zero at a central point.) If it is desired to keep the cobalt content low, then it is desirable to establish a gradient of cobalt composition, being rich in cobalt in the outer bulk, allowing for high lithium mobility there, and poor in cobalt in the inner bulk. Such a particle is an optimized compromise between a low averaged cobalt stoichiometry and the requirement for high effective lithium transport kinetics. The effective diffusion constant of a particle of such a material is larger than that of a uniform particle with the same averaged composition.

$LiNi_{1/2}Mn_{1/2}O_2$ based materials have a lower electronic conductivity than $LiCoO_2$. A good electronic conductivity across the electrode in a battery is required to support high rates and keep the polarization low. The electrode conductivity is improved by adding conductive additives like carbon black to the electrode. To keep processing cost low, to enable a high volume density, and to allow for a sufficient electrolyte filled porosity (to enable for the fast transport of lithium across the electrode in the liquid phase) the amount of carbon additive is chosen as low as possible. Because of the lower conductivity $LiNi_{1/2}Mn_{1/2}O_2$ based materials generally tend to require larger loadings of conductive additive and they will be more sensitive to non-optimized electrode processing. The electronic conductivity can be improved by increasing the cobalt stoichiometry.

Is preferable that outer bulk of particles has a good electronic conductivity. A lower electronic conductivity in the inner bulk can be tolerated. If it is desired to keep the cobalt content low it is preferable to establish a gradient of cobalt content, being rich in cobalt in the outer bulk, and poor in cobalt in the inner bulk. Such a particle is an optimum compromise between a low averaged cobalt stoichiometry and the requirement of high effective electronic conductivity.

An optimum cathode powder consists of isotropic secondary particles. This simplifies the processing of the powders in the coating step, and isotropic particles deliver electrodes with high density and straight porosity with low turtoisity, which is desired to enable a fast transport of lithium in the liquid phase across the electrode. (The transport kinetics of lithium in the electrolyte is much faster than in the solid.) Low cobalt cathode materials preferably have particles with some open porosity to allow for the fast transport of lithium into the inner of the particle. Otherwise, a large porosity is undesired since it lowers the volumetric energy density.

In the case of porous secondary particles, consisting of sintered agglomerates of smaller dense primary particles it is desirable if the porosity has a gradient, being larger in the outer bulk and smaller in the inner bulk. Open porosity allows for fast diffusion of lithium within in liquid filled pores into the particle. Because the rate of lithium transport reduces from the outside to the inside, a maximum porosity at the outside and a minimum porosity at the inside are desired. Surprisingly it was observed that the co-precipitation of mixed $Ni_{1/2}Mn_{1/2}$ hydroxide delivers hydroxide particles with low porosity whereas cobalt containing mixed $(Ni_{1/2}Mn_{1/2})_{1-x}Co_x$ hydroxide, delivers particles with higher porosity. Therefore, a precipitation reaction, where denser particles with low cobalt stoichiometry act as seeds to be covered by a more porous layer with higher cobalt stoichiometry will deliver the desired gradient of porosity. The gradient shrinks but basically remains during moderate sintering.

The lithium mobility, the electronic conductivity and the porosity do not dramatically depend on the transition metal composition. Therefore only a significant change of stoichiometry by at least 10%, preferable at least 15% of manganese as well as nickel as well as cobalt between inner bulk and outer bulk allows to obtain fully optimized cathodes.

$LiCoO_2$ has the advantage that it has a large lithium ionic mobility. Powders comprised of larger and dense particles still supply a sufficient rate performance, but allow for high powder density. $LiCoO_2$ however, shows poor safety, and poor cycling stability at higher voltage versus $Li/Li^+$ whereas $LiMn_{1/2}Ni_{1/2}O_2$ materials are safer. Safety is a complex issue, involving different exothermic reactions. In a severe event, a chain of exothermic reactions causes thermal runaway, and the cell might explode. One important exothermic reaction is the electrolyte oxidation. It occurs at the surface of the cathode particle at slightly elevated temperature. Another important exothermic reaction is the collapse of the delithated cathode occurring at higher temperature.

A performance optimized, cobalt rich cathode material has a gradient of cobalt stoichiometry. In the inner bulk a high Co stoichiometry is desired to enable fast rate performance. The composition in the bulk can be 100% $LiCoO_2$, or doped $LiCoO_2$ (like $LiCo_{0.9}Mn_{0.05}Ni_{0.05}$). Doped $LiCoO_2$ is preferred if better stability against the collapse reaction is desired. In the outer bulk, the cobalt composition is lower, which promises better stability against electrolyte oxidation, and improved safety. After igniting the electrolyte oxidation, the propagation of exothermic reaction into the bulk of the particle is slowed down due to the better stability of the outer bulk against collapse.

It is reasonable that safety properties gradually improve with decreasing cobalt stoichimetry. Therefore a significant change of manganese as well as nickel as well as cobalt stoichiometry by at least 10%, preferable by at least 15% between outer bulk and inner bulk is required to obtain fully optimized cathodes.

In addition to the different stoichiometries in outer bulk and inner bulk the surface of the particle can be modified as described in the coating literature by introducing additional dopands like Al, $Cr^{3+}$, MgTi, Mn etc. into the surface near region. In this way a lower catalytically activity in respect to electrolyte oxidation can be achieved, further improving safety and cycling stability.

The actual invention also allows for further optimization. During cycling, impedance layers can be formed by electrolyte decomposition products. These impedance layers are more severe if the surface area is low. As a result, it might be preferable to modify the morphology near to the surface to achieve a higher surface, without introducing porosity in the inner bulk. A preferred typical particle could have a dense inner bulk, with composition near to $LiCoO_2$. The outer bulk has a cobalt gradient, and the outer region of the outer bulk has a low cobalt stoichiometry, and in addition it has a significant surface roughness.

Obtaining materials with significantly different transition metal composition at the inner and outer bulk in certain cases can cause further advantages, which cannot be obtained with uniform materials. If the composition in the bulk corresponds to a set of crystallographic lattice constants $a_{hex}$ and $c_{hex}$, and the composition in the outer bulk corresponds to different constants $a'_{hex}$ and $c'_{hex}$, then a radial field of crystallographic strain evolves. During sintering this strain can cause a preferred orientation in the outer bulk. If the crystal structure is layered, then the layers could arrange themselves perpendicular to the surface, thus allowing excellent rate performance and resistance against a fracture of particles. Even if the layers are still arranged isotropical, the strain can cause a slight widening of the layer distance, supporting a fast lithium diffusion, also causing improved rate performance In the following the "significant change" of stoichiometry of cobalt, as well as nickel as well as manganese between inner bulk and outer bulk will be defined. A particle consists of bulk and surface. Surface is the outermost region of a compact particle, with maximum thickness of 10-20 nanometer. In this invention, the bulk is divided into an inner and an outer bulk. The inner bulk is an inner region of a typical particle, and the outer bulk is the layer surrounding the inner bulk, extending out towards the surface. It is useful to define that the inner bulk contains 50% of the total number of cobalt, manganese and nickel cations of the bulk, and the outer bulk contains the remaining 50% of the manganese, cobalt and nickel cations.

Change of stoichiometry is in this invention specified that the average stoichiometry for manganese as well as nickel as well as cobalt in the outer bulk and inner bulk differs. More precisely, a significant spatial change is present, if the difference of averaged stoichiometry for any of cobalt, manganese and nickel in outer and inner bulk, divided by the averaged stoichiometry in the whole bulk exceed 10%, preferable exceeds 15%.

If the averaged transition composition in the outer bulk is for example $Ni_{1/3}Mn_{1/3}Co_{1/3}$ and the averaged composition in the inner bulk is $Ni_{0.4}Mn_{0.4}CO_{0.2}$, then the stoichiometry vary significantly. The cobalt stoichimetry varies by 50%, $(1/3-0.2)/(0.5(1/3+0.2))=0.5$. The nickel and manganese stoichiometries vary by 18.1%, $(0.4-1/3)/(0.5(0.4+1/3))=2/11=0.181$ If for example a precipitate containing $Mn_{1/2}Ni_{1/2}$ has been precipitated onto the surface of a particle being $LiCoO_2$, and all precipitate is within the outer bulk, then at least 1/9 mol $Mn_{1/2}Ni_{1/2}$ was needed to precipitated for 1 mol Co to obtain a significant change of stoichiometry for cobalt: (The inner volume contains $\geq 5/9$ mol cobalt, the outer volume contains $\geq 1/18$ mol Mn, $\geq 1/18$ mol Ni and $\leq 4/9$ mol Co. The average cobalt concentration (=stochiometry) is $\leq 0.9$. Thus $N_i \geq 1/9$, and $A_i \leq 0.9$. The value $N_i/A_i$ for cobalt is in this case $1/9/0.9 \geq 0.1$. The values for manganese and nickel are much larger than 0. 1.)

The dividing of the bulk into inner and outer bulk can similar, but strictly be defined as follows: The inner bulk as well as the outer bulk each contain ½ of the total number of transition metal cations (manganese, nickel and cobalt). The inner bulk has the same shape as the particle. In the case of a porous particle, the shape of the particle is obtained by a suitable averaging of the surface. Additionally, the center of mass of the inner bulk and of the particle coincides.

The requirement that changes of all stoichiometries exceed 10%, preferable 15% can strictly be formulated as follows: A positive number $N_i$ is the difference of averaged local concentrations $C_i$ in the inner and outer bulk for each component i. $A_i$ is the concentration of the component i averaged over the whole bulk. We speak about a significant change of stoichiometry if for all i chosen from {Co, Mn, Ni} the value of $N_i/A_i$ exceeds 0.1.

$$\frac{N_i}{A_i} = \frac{\left| \frac{1}{vol_{inner\ bulk}} \int_{InnerBulk} d\vec{x}^3 C_i(\vec{x}) - \frac{1}{vol_{outer\ bulk}} \int_{OuterBulk} d\vec{x}^3 C_i(\vec{x}) \right|}{\frac{1}{vol_{all\ bulk}} \int_{all\ Bulk} d\vec{x}^3 C_i(\vec{x})} > 0.1,$$

for all $i = \{Co, Mn, Ni\}$

The preparation of performance optimized cathode materials with spatially varying transition metal stoichiometry according the present invention by a simple solid state reaction from different single-cation containing precursors is not recommended because it usually will not allow to achieve the desired spatial change of transition metal stoichiometry.

Instead of this, they are prepared by 3 reactions. A precipitation reaction delivers a slurry containing the primary materials with significant spatial change of transition metal stoichiometry. These materials are used as precursors in a second reaction, involving drying after an eventual ion exchange reaction to deliver precursor materials having a similar spatial change stoichiometry. The third reaction is a solid state reaction of the precursor material with a source of lithium, followed by sintering.

The final lithium transition metal oxide preferable has a smooth change of transition metal stoichiometry. Precursor materials don't need to have a smooth radial change of transition metal stoichiometry. It is sufficient that a solid state solutions between the transition metal composition at outer and inner bulk exist. By a suitable choice of sintering temperature the transition metal stoichiometry will relax, so that the desired significant and smooth change of stoichiometry is obtained.

Suitable precursors are mixed hydroxides, mixed oxohydroxides, mixed carbonates, mixed carbonate-hydroxides, or mixed transition metal oxides. They are characterized that the transition metal composition of manganese, as well as nickel as well as cobalt in the inner bulk differs significantly from the transition metal composition in the outer bulk.

Particles of the primary materials, which is used to prepare the precursor materials have an identical or almost identical spatially change of transition stoichiometry as the precursor material. Primary materials are mixed hydroxides, oxohydroxides, carbonates, or carbonate hydroxides. They can also be composite materials, for example being a mixed oxide in the center of the particle, surrounded by a thick layer of mixed hydroxide or mixed carbonate. They are characterized that the transition metal composition of nickel as well as manganese as well as cobalt in the inner bulk differs significantly from the composition in the outer bulk. The primary materials can contain further ions like sulfate, chloride, fluorite, sodium or potassium.

The primary material is prepared by a precipitation reaction. It is not recommended to apply sol-gel routes as described in the coating literature. The cost is higher. The concentration of transition metal in the gel is lower than in precipitated hydroxide or carbonate. A thick compact hydroxide or carbonate layer allows achieving a significant spatial variation of transition metal stoichiometry. With a gel layer of the same thickness less transition metal is coated, and the change of average stoichiometry of inner bulk and outer bulk is less than 10-15% for the transition metal of the original particle. Otherwise, it is difficult to obtain mechanically stable gel layers with sufficient thickness.

The coprecipitation reaction yields the primary material having a spatial significant different transition metal stoichiometry. Typical primary materials consist of particles with narrow or broad distributions with size in the range 3-30 μm. The composition and morphology can be altered by an exact control of precipitation conditions, like pH, temperature, flow rate, concentration, composition, complex forming additives, ionic additives, reduction additives, thickening, reactor volume, reactor design etc.

In the precipitation reaction at least one flow containing a dissolved transition metal salt (like metal sulfate ) with transition metal composition M2 and a flow, containing dissolved anion (like $OH^-$ or $CO_3^{2-}$) are fed to a reactor. The reactor contains a slurry of particles with average transition metal composition M1. In a well designed precipitation reaction the degree of super saturation is not to high. Existing particles with composition M1 act as seeds and grow continuously. Practically no new particles are formed. The particles are covered by a layer of precipitate with transition metal composition M2. A thick coating layer, and avoiding the formation of undesired new seeds, can only be achieved if the precipitation reaction is slow, typical times being at least about 10 minutes. Reactions which are completed in less/about 1 minute don't allow a controlled growth of a thick layer of precipitate only on the surface of seed particles. The spatial variation of stoichiometry of the primary material is achieved when the composition M2 of transition metal fed to the reactor differs significantly from the average transition metal composition M1 of the actual seed particles.

The reactor can be one reaction vessel, or more than one reaction vessel, suitable connected with each other. The precipitation reaction can be made at ambient temperature (<30° C.), at slightly elevated temperature (30-60° C.) or at high temperature (>60° C.). At lower temperature typically primary material with higher content of ions like $SO_4$, Cl, F, Na or K are achieved. The precipitation reaction can be made in one step, or in several steps. It might be preferable to perform several precipitation steps, interrupted by "thickening" (removing of "clear" alkali salt solution for example by filtering). Alternatively the precipitation can be performed semi-continuously, or continuously during simultaneous thickening of the solution.

After the precipitation reaction it is usually desirable to modify the content or composition of further anions, eventually present in the primary material. This is preferable achieved by an ion exchange reaction. In mixed hydroxides, for example some or all $SO_4^{2-}$ anions can be replaced by $Cl^-$ or $F^-$ anions, or $CO_3^{2-}$, ions, or by $OH^-$ anions. After separating the primary material from the solution, it is preferable washed and dried. The drying can be combined with a heat treatment. As a result, the primary material has transformed to the precursor material. Typical precursor materials are transition metal oxohydroxides, carbonates, oxocarbonates, or oxides. They might contain additional ions like sulfate, chloride, fluorite, sodium or potassium. The precursor material has essentially the same morphology and the same gradient of transition metal composition as the primary material.

Finally the lithium transition metal oxide is prepared by reacting a source of lithium with the precursor material, followed by a sintering to densify the cathode. During sintering, the morphology of the precursor material changes more or less. The sintering temperature has to be low enough to preserve the spatial change of transition metal stoichiometry. If the temperature is too high, and the sintering time too long, then the gradient of transition metal stoichiometry disappears.

Densification by sintering is essential to obtain cathode powders with high press density. If the density is not sufficient, then the battery will suffer from less volumetric energy density. Densification occurs by a diffusive transport of cations and anions driven by differences in surface tension. Lithium (and probably oxygen) diffuses fast, the diffusion of cations like transition metal and of other dopands like Al or Mg is slow. Also the diffusion, which relaxes the gradient of metal stoichiometry is slow. The latter requires a diffusion with a typical diffusion length in the order of the radius of the secondary particle. Contrary, the processes causing a densification of the particle, have a typical length of diffusion in the order of the distance of pores. Since the fist diffusion length is at least 10 times larger then the second, a typical relaxation time of the first process (assuming the same driving force) is 100 times slower. This allows achieving a densification of the particles with only a partial lowering the gradient of metal stoichimetry.

The use of molten salts as sintering agents (preferably formed in-situ) can further reduce the relaxation of the gradient during sintering. Sintering aids (preferable soluble salts) are effective to supply a faster diffusion parallel and near the interface of molten salt and solid, which causes the densification but it does not increase the kinetics of the bulk diffusion, thus preserving the stoichiometry gradient. They allow a lowering of the sintering temperature, thus reducing cost.

Soluble salts, acting as sintering agents, can be achieved by adding additional salt(s) before the reaction step. The salt should have a high thermodynamically stability to coexist in contact with the final lithium transition metal oxide. Alternatively, the composition and concentration of the soluble salts can be modified by ions present in the precursor material. Anionic or cationic impurities (like sulfate or sodium) can undergo chemical reaction, transforming to thermodynamically stable salts, which act as sintering aids. In this way the additional anions or cations are transferred to a soluble form, and can be washed away after sintering. Sintering occurs at a temperature above or about the melting point of the salt.

The preferred application of the final material is a performance optimized lithium transition metal oxide, used as cathode material in rechargeable lithium batteries. However, possible applications are not limited to this. Possible further applications include mixed hydroxides, used as cathodes in rechargeable alkaline batteries, mixed oxides or carbonates, applied as electrodes in super capacitors, catalysts, etc. To give a possible application: Rechargeable alkaline batteries apply $Ni(OH)_2$ based cathodes. Manganese is cheap, and in principle, Mn—Ni based hydroxides could work well, however, the manganese tends to dissolve at high pH into the electrolyte. An optimized cathode could for example have an inner bulk composition of $M(OH)_2$ ($M=Mn_{1/2}Ni_{1/2}$), protected from Mn dissolution by a $M(OH)_2$ surface, where M is Co.

Super capacitors and catalysts require electrodes with a large surface area. Porous transition metal oxides with very large surface area can be prepared from mixed hydroxides or carbonates by a mild heating. Similar as in Li-battery cathodes, the requirements for porosity and electronic conductivity for super cap electrode material particles in the inner bulk, the outer bulk and the surface are different. A performance optimized cathode electrode material could be a mixed oxide or lithium metal oxide with very fine open porosity, having a surface area in the range of 50-100 $m^2/g$, and having significantly different transition metal compositions in the inner and outer bulk.

The invention is in the following in more detail described by examples.

0. Preparation of Seeds

EXAMPLE 0.1

A precipitation reaction is performed.

Flows of NaOH and $MSO_4$ ($M=Mn_{1/2}Ni_{1/2}$) are added to a precipitation vessel during rigid stirring. The temperature is 90° C. The pH (measured at 50° C.) is kept at about 9.2-9.4. After 50 min the reactor is filled.

After 15 minutes, solid particles and clear liquid have separated. About 60% of the $Na_2SO_4$ solution is removed and a second precipitation reaction is performed.

The obtained slurry can be used as seed in further precipitation reactions. Alternatively, it can be filtered, dried, and modified, resulting in a MOOH, $MO_x$ or $LiMO_2$ which can be used as seed in further precipitation reactions.

For investigating the precipitated mixed hydroxide, a part of the slurry was filtered, washed in water, then it was equilibrated in a solution of LiOH (to remove approx. 1% $SO_4$), followed by filtering, wash, and drying at 180° C.

FIG. 1 shows a FESEM micrograph of the obtained seed. The particles are compact, and have some porosity.

EXAMPLE 0.2

A precipitation reaction is performed.

Flows of 2 molar $Na_2CO_3$ and 2 molar $MSO_4$, $M=(Mn_{1/2}Ni_{1/2})_{5/6}Co_{1/6}$ are added to a precipitation vessel during rigid stirring. The flowrate of $Na_2CO_3$ was 10% higher that the flow rate of $MSO_4$. The temperature is 80° C. After 30 min the reactor is filled.

After 15 minutes, solid particles and clear liquid have separated. About 70% of the $Na_2SO_4$ solution is removed. Then a second precipitation reaction is performed.

The obtained slurry can be used as seed in further precipitation reactions. Alternatively, it can be filtered, dried, and modified, resulting in a MCO3, $MO_x$ or $LiMO_2$ which can be used as seed in further precipitation reactions For investigation the precipitated mixed carbonate, a part of the slurry was filtered and washed in water followed by filtering and drying at 180° C.

Figure 2:
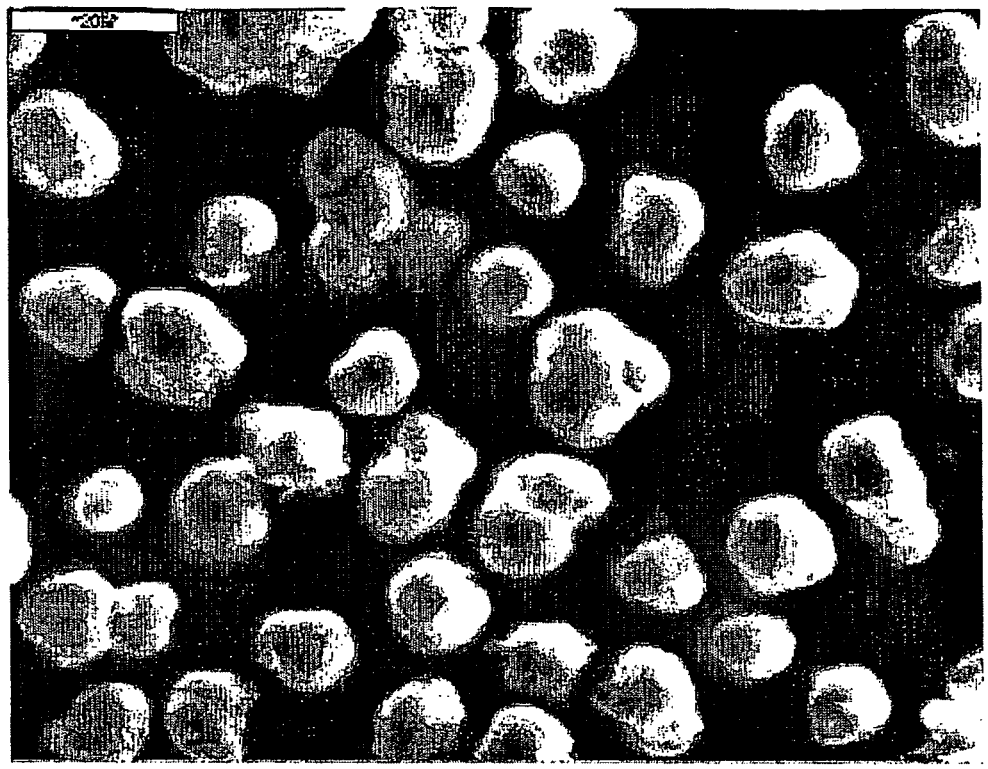
FIG. 2 shows SEM micrograph of a $MCO_3$ ($M=(Mn_{1/2}Ni_{1/2})_{5/6}Co_{1/6}$) seeds prepared by coprecipitation of $MSO_4$ with $Na_2CO_3$ according to Example 0.2.
Figure 2:
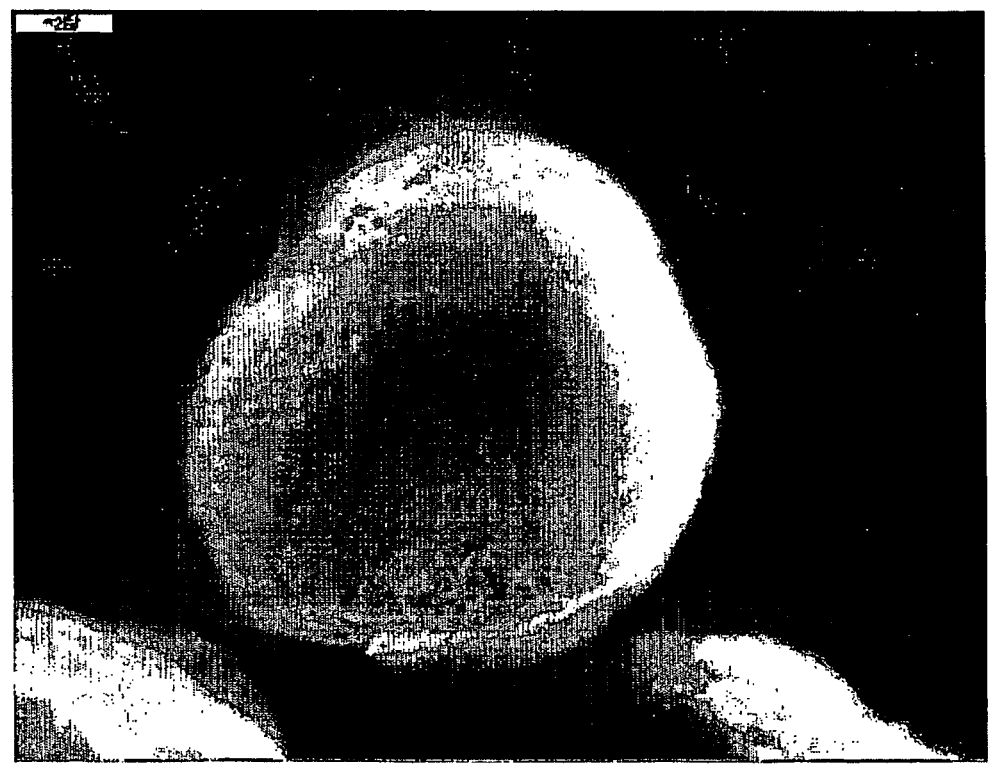

FIG. 2 shows a SEM micrograph of the obtained seed. The particles are compact and have a low porosity.

EXAMPLE 0.3

Figure 3:
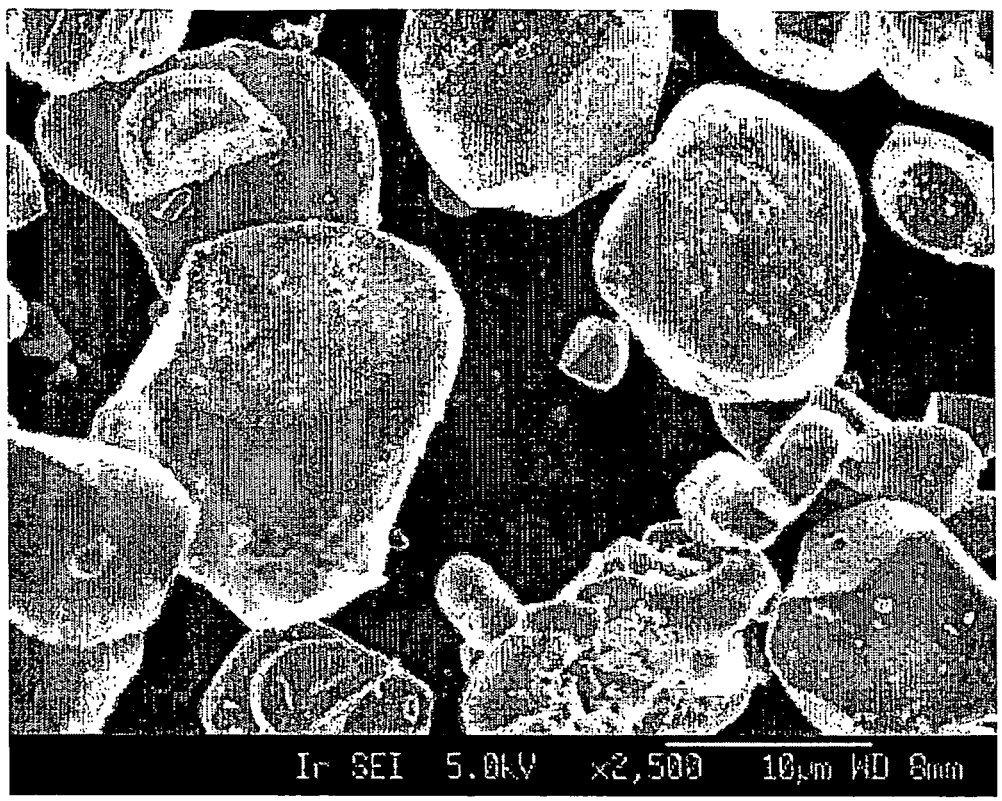
FIG. 3 shows a FESEM micrograph of $LiCoO_2$ seed, which is commercial powder.
Figure 3:
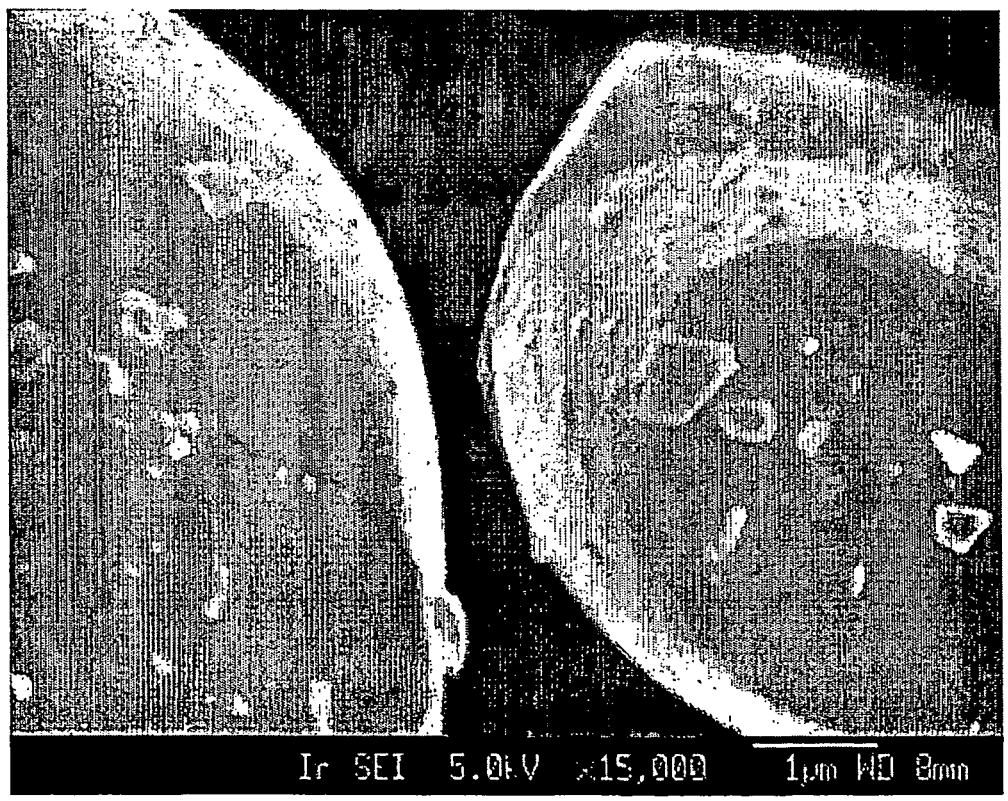

A commercial $LiCoO_2$ sample was obtained. The samples consist of dense single particles, not of aggregates of primary particles. FIG. 3 shows a FESEM micrograph of the commercial powder.

The pH is 10.8, measured after immersing 2 g sample into 40 ml $H_2O$.

EXAMPLE 0.4

Commercial $LiMO_2$ with $M=Mn_{0.4}Ni_{0.4}Co_{0.2}$ was obtained

EXAMPLE 0.5

$Li(Co_{0.8}Mn_{0.1}Ni_{0.1})O_2$ and $Li[Co_{2/3}(Mn_{1/2}Ni_{1/2})_{1/3}]O_2$ is prepared by precipitating a mixed hydroxide as described in example 0.1, followed by an equilibration in a LiOH solution. After washing and drying, the hydroxide powder was mixed with $Li_2CO_3$ and a solid state reaction was performed.

1. Preparation of Primary Material

EXAMPLE 1.1

The thickened slurry of example 0.1 is used as seed in a precipitation reaction, similar as that described in example 0.1 with the exception, that the transition metal flow now is $MSO_4$ with $M=(Mn_{1/2}Ni_{1/2})_{5/6}Co_{1/6}$. After thickening (removing of $Na_2SO_4$) a second precipitation follows.

After thickening a third and fourth precipitation follows in a similar manner, with the exception that the transition metal flow is changed to $MSO_4$ with $M=Mn_{1/3}Ni_{1/3}Co_{1/3}$. After each second preparation step a small sample is removed for investigation. It is washed and dried, and the morphology is investigated by SEM. The particle size distribution is obtained from laser diffraction. Tap density is measured.

EDS shows that the hydroxide contains about 1% sulfate. The SEM and laser diffraction investigation shows that particles grow continuously in size. The tap density increases, caused by reduction of porosity. Practically, no new particles are formed.

As a result an anion containing mixed transition metal hydroxide primary material is achieved, which has a significantly different transition metal stoichiometry in inner and outer bulk.

EXAMPLE 1.2

The thickened slurry of example 0.2 is used in a precipitation reaction, similar as that described in example 0.2 with the exception, that the transition metal flow was $MSO_4$ with $M=(Mn_{1/2}Ni_{1/2})_{5/6}Co_{1/6}$. After thickening (removing of $Na_2SO_4$) a second precipitation follows.

After thickening a third and fourth precipitation follows in a similar manner, with the exception that the transition metal flow is changed to $MSO_4$ with $M=Mn_{3/8}Ni_{3/8}Co_{1/4}$.

After thickening a fifth and sixth precipitation follows in a similar manner, with the exception that the transition metal flow is changed to $MSO_4$ with $M=Mn_{1/3}Ni_{1/3}Co_{1/3}$.

Finally, a seventh precipitation follows in a similar manner, with the exception that the transition metal flow is $CoSO_4$, and that the precipitation only is performed for 5 minutes After each second preparation step a small sample is removed for investigation. It is washed and dried, and the morphology is investigated by SEM. The particle size distribution is obtained from laser diffraction. Tap density is measured.

The SEM and laser diffraction investigation shows that particles grow continuously in size. Practically, no new particles are formed. The tap density increases fast during the first 3 precipitations, caused by a fast disappearance of porosity in particles. Then it almost remains. ICP shows that the mixed carbonate contains about 8% sodium.

As a result a cation containing mixed transition metal carbonate primary material is achieved, which has a significantly different transition metal stoichiometry in inner and outer bulk.

EXAMPLE 1.3.1

The $LiCoO_2$ of example 0.3 was used as seed in a precipitation reaction, similar as that described in example 0.1 with the exception, that 4 molar LiOH was used instead of NaOH, and the transition metal flow was $MSO_4$ with $M=(Mn_{1/2}Ni_{1/2})_{5/6}Co_{1/6}$. The temperature was 60° C.

A total of two precipitation reactions, interrupted by thickening were applied. The total stoichiometric amount of precipitated $M(OH)_2$ is 20% of the $LiCoO_2$ used as seeds. As a result a primary material is achieved, where typical particles have a core of $LiCoO_2$ completely surrounded by a thick layer of $M(OH)_2$ ($M=(Mn_{1/2}Ni_{1/2})_{5/6}Co_{1/6}$). EDS and ICP show that the $M(OH)_2$ contains about 5% sulfate.

EXAMPLE 1.3.2

The $LiCoO_2$ of example 0.3 was used as seed in a precipitation reaction, similar as that described in example 0.1 with the exceptions that the transition metal composition of the sulfate flow was $M=Mn_{1/2}Ni_{1/2}$.

A total of two precipitation reactions, interrupted by thickening were applied. The total stoichiometric amount of precipitated $M(OH)_2$ is 25% of the $LiCoO_2$ used as seeds.

As a result a primary material is achieved, where typical particles have a core of $LiCoO_2$, completely surrounded by a thick layer of $M(OH)_2$ ($M=Mn_{1/2}Ni_{1/2}$.

EXAMPLE 1.3.3

The $LiCoO_2$ of example 0.3 was used as seed in a precipitation reaction, similar as that described in example 0.2. The transition metal flow was $MSO_4$ with $M=(Mn_{1/2}Ni_{1/2})_{5/6}Co_{1/6}$. The temperature was 80° C.

A total of two precipitation reactions, interrupted by thickening were applied. The total stoichiometric amount of precipitated $MCO_3$ is 20% of the $LiCoO_2$ used as seeds.

As a result a primary material is achieved, where typical particles have a core of $LiCoO_2$ completely surrounded by a thick layer of a mixed transition metal carbonate based material. ICP shows that the carbonate phase contains about 8 atomic% sodium per precipitated transition metal

EXAMPLE 1.3.4

The $LiCoO_2$ of example 0.3 was used as seed in a precipitation reaction, similar as that described in example 0.1. The transition metal flow was $MSO_4$ with $M=(Mn_{5/8}Ni_{3/8})$. The temperature was 95° C.

One precipitation reactions was applied. The total stoichiometric amount of precipitated $MCO_3$ is 11% of the $LiCoO_2$ used as seeds.

As a result a primary material is achieved, where typical particles have a core of $LiCoO_2$ completely surrounded by a thick layer of a mixed transition metal hydroxide.

EXAMPLE 1.4.1

The $LiMO_2$ of example 0.4 was used as seed in a precipitation reaction as described in example 0.1 with the exception, that the pH was about 11, the temperature was about 60° C. and the transition metal flow was $CoSO_4$. Additionally, 1 mol ammonium sulfate was added for 1 mol precipitated $M(OH)_2$.

A total of two precipitation reactions, interrupted by thickening were applied. The total stoichiometric amount of precipitated $Co(OH)_2$ is 20% of the $LiMO_2$ used as seeds.

As a result a primary material is achieved, where typical particles have a core of $LiMO_2$ $M=M=(Mn_{1/2}Ni_{1/2})_{5/6}Co_{1/6}$, completely surrounded by a thick layer of a cobalt hydroxide

EXAMPLE 1.4.2

The $LiMO_2$ of example 0.4 was used as seed in a precipitation reaction as described in example 0.1 with the exception, that the transition metal flow was $Co_{2/3}Mn_{1/6}Ni_{1/6}SO_4$. No ammonium sulfate was added.

EXAMPLE 1.5

Similar as example 1.3.2, with the exception that not $LiCoO_2$, but the $LiMO_2$ powder of example 0.5 was used.

As a result a primary material is achieved, where typical particles have a core of $Li[Co_{0.8}Mn_{0.1}Ni_{0.1}]O_2$ respectively $Li[Co_{2/3}(Mn_{1/2}Ni_{1/2})_{1/3}]O_2$ completely surrounded by a thick layer of a mixed transition metal hydroxide $M(OH)_2$ with $M=Mn_{1/2}Ni_{1/2}$

EXAMPLE 1.6

By injecting flows containing further anions or cations into the precipitation vessel during precipitation, the composition of the primary material can be modified.

Adding $Cl^-$ or $F^-$ to a hydroxide precipitation yields Cl or $F^-$ containing mixed hydroxide.

By lowering the temperature of the hydroxide precipitation, the $SO_4$ content can be increased.

By changing the flow ratio of the carbonate precipitation, allows to decrease the sodium content, and allows to increase the sulfate content of the primary material.

2. Preparation of Precursor Materials

EXAMPLE 2.1

The primary material of example 1.1 is modified by ion exchange. The sulfate impurity is removed by ion exchanging in a NaOH solution. The ion exchange reaction was made for 3 h at 50° C. with a 10:1 ratio of $NaOH:SO_4$. After ion exchange the primary material is washed, filtered and dried at 180° C.

After this treatment a mixed oxohydroxide precursor material with approximate composition MOOH is achieved, where the transition metal composition changes significantly between inner and outer bulk.

EXAMPLE 2.2

The primary material of example 1.2 is washed, filtered and dried at 180° C. A mixed transition metal carbonate based precursor material is achieved where the transition metal composition changes significantly between inner and outer bulk.

EXAMPLE 2.3.1

The primary material of example 1.3.1 was ion exchanged in a solution of LiOH to remove the sulfate impurity. Then it was washed, filtered and dried at 180° C.

Investigation by SEM+EDS, ICP, particle size analyis, FESEM show that a precursor material is achieved, where cores of LiCoO$_2$ are surrounded by a complete, thick layer of MOOH, M=M=(Mn$_{1/2}$Ni$_{1/2}$)$_{5/6}$Co$_{1/6}$.

Figure 4:
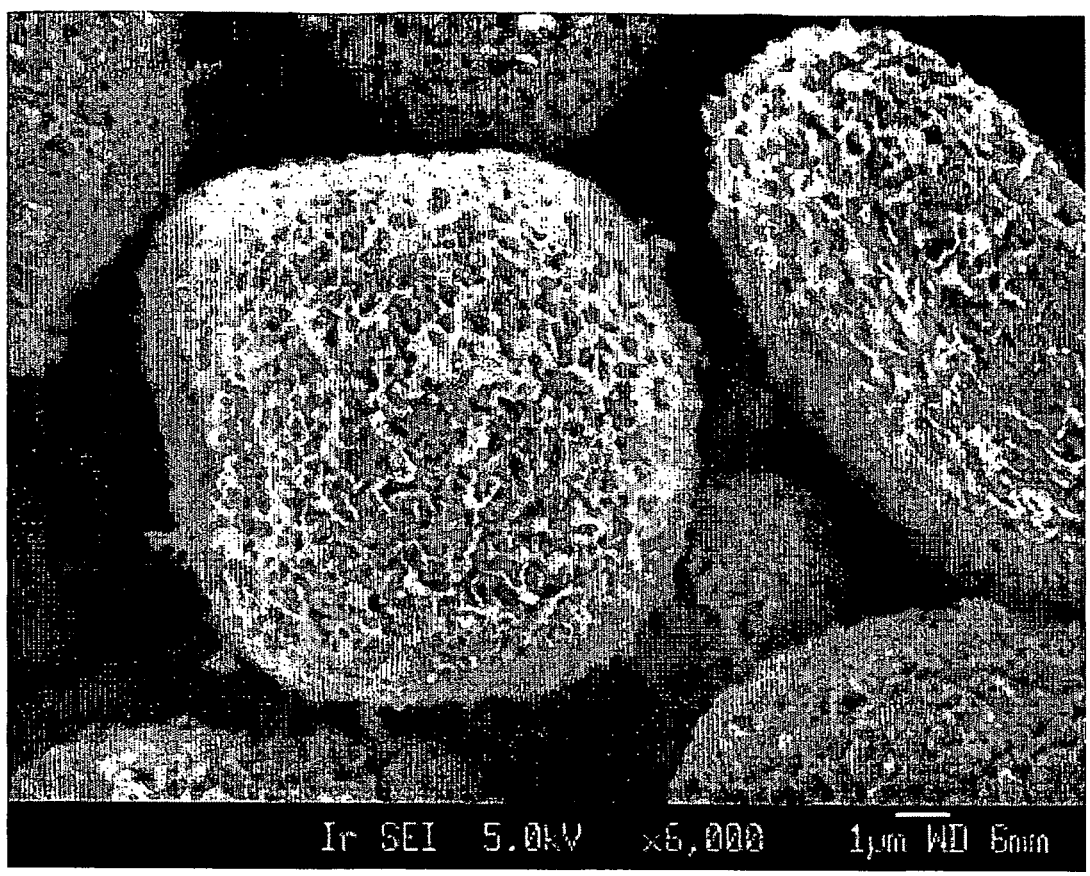
FIG. 4 shows FESEM of the sample of example 2.3.1, wherein the particles are $LiCoO_2$ covered by a thick layer of porous MOOH, $M=(Mn_{1/2}Ni_{1/2})_{5/6}Co_{1/6}$. A total of 0.2 mol MOOH was coated onto 1 mol $LiCoO_2$.

FIG. 4 shows a FESEM micrograph of a typical particle.

EXAMPLE 2.3.2

The primary material of example 1.3.2 was ion exchanged in a solution of LiOH to remove the sulfate impurity. Then it was washed, filtered and dried at 180° C.

Investigation by SEM+EDS, particle size analyis, FESEM show that a precursor material is achieved, where cores of LiCoO$_2$ are surrounded by a complete, thick layer of MOOH, M=Mn$_{1/2}$Ni$_{1/2}$. The layer is denser than that obtained by example 2.3.1.

Figure 5:
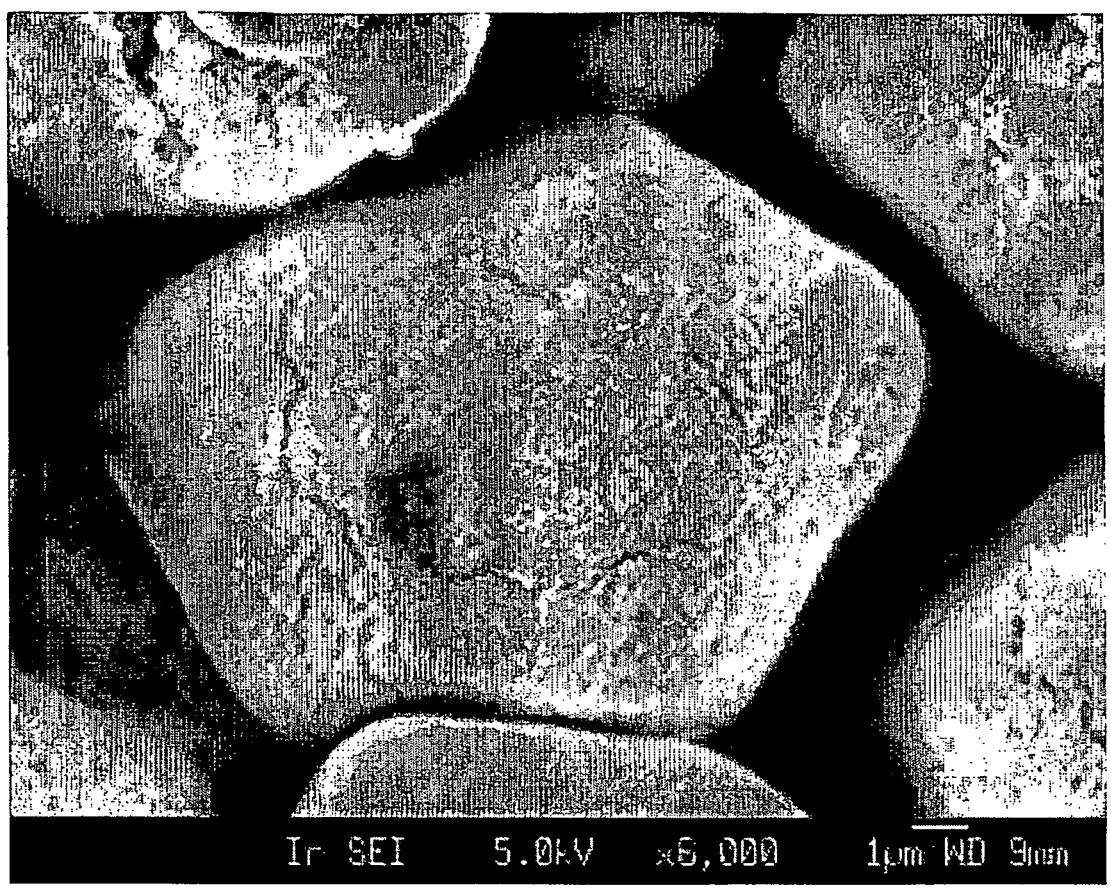
FIG. 5 shows FESEM of the sample of example 2.3.2, wherein the particles are $LiCoO_2$ covered by a thick layer of MOOH, $M=Mn_{1/2}Ni_{1/2}$. A total of 25% MOOH was coated onto $LiCoO_2$.

FIG. 5 shows a FESEM micrograph of a typical particle.

EXAMPLE 2.3.3

The primary material of example 1.3.3 was washed, filtered and dried at 180° C.

Investigation by SEM+EDS, particle size analyis, FESEM show that a precursor material is achieved, where cores of LiCoO$_2$ are surrounded by a complete, thick layer of a MCO$_3$ based material. The MCO$_3$ based material contains about 8% sodium per precipitated transition metal.

Figure 6:
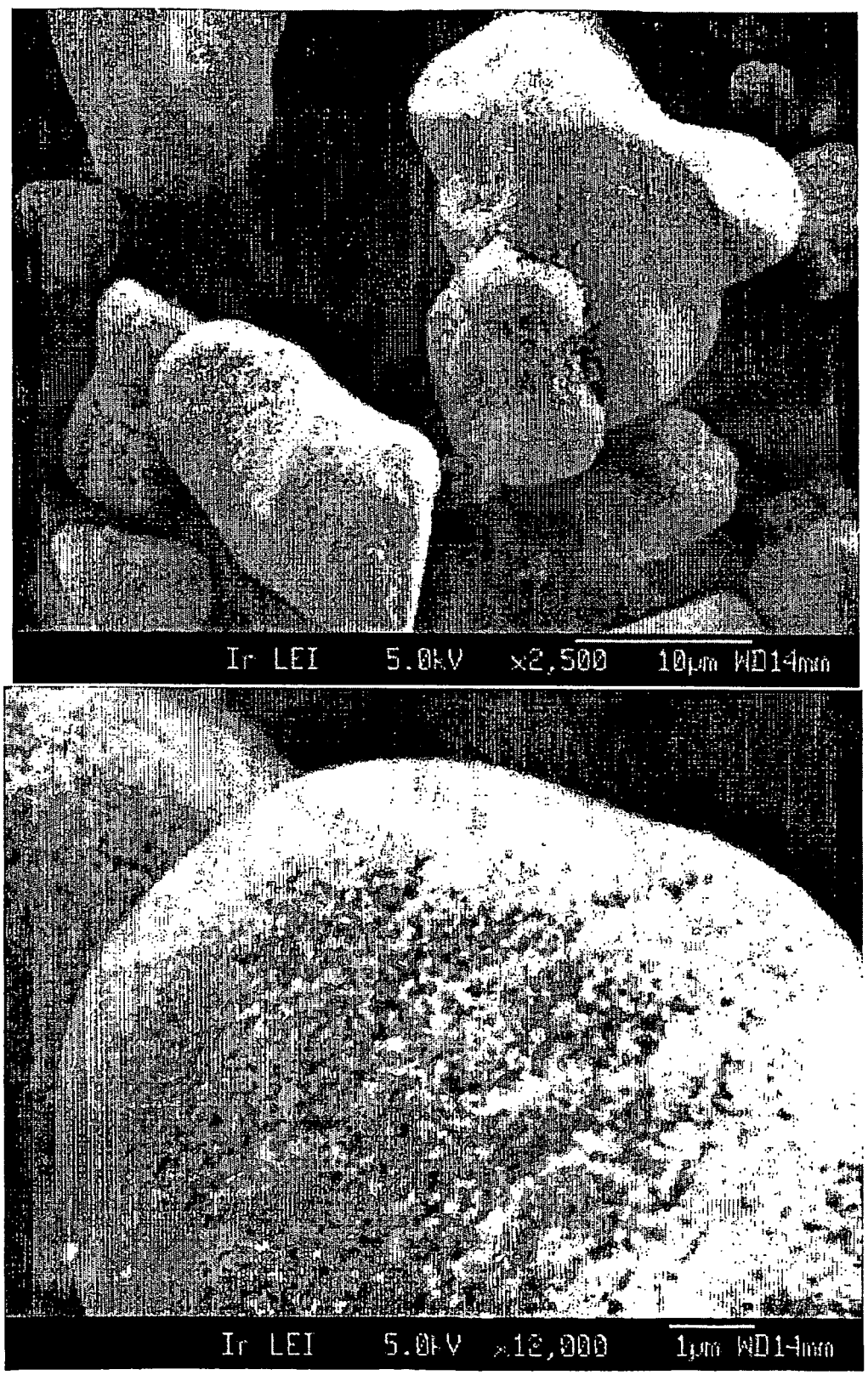
FIG. 6 shows FESEM of $MCO_3$ coated $LiCoO_2$, prepared according to Example 2.3.3.

FIG. 6 shows a typical FESEM micrograph.

EXAMPLE 2.3.4

The primary material of example 1.3.2 was ion exchanged in a solution of LiOH to remove an eventual sulfate impurity. Then it was washed, filtered and dried at 180° C.

Investigation by SEM+EDS, particle size analyis, FESEM show that a precursor material is achieved, where cores of LiCoO$_2$ are surrounded by a complete, thick layer of MOOH, M=Mn$_{1/2}$Ni$_{1/2}$. The layer is denser than that obtained by example 2.3.1.

Figure 7:
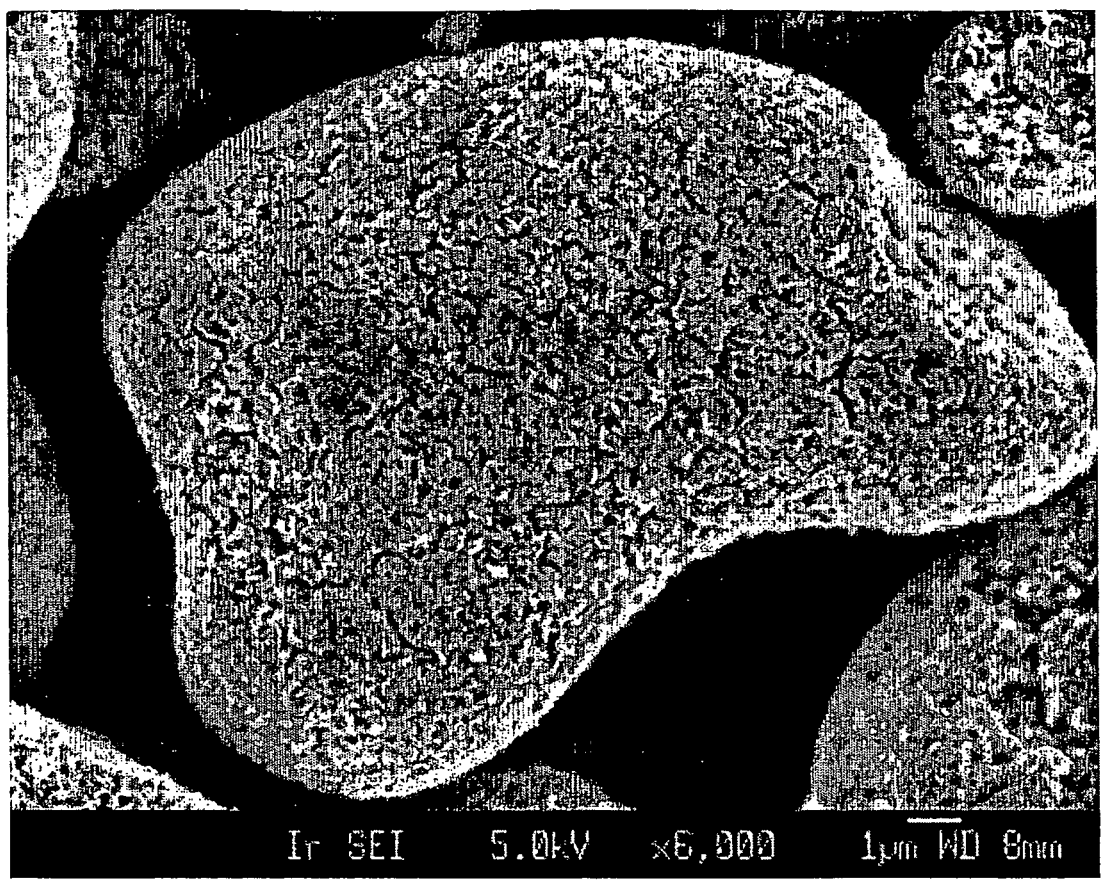
FIG. 7 shows FESEM of MOOH ($M=Mn_{5/8}Ni_{3/8}$) coated $LiCoO_2$, prepared according to Example 2.3.4

FIG. 7 shows a FESEM micrograph of a typical particle.

EXAMPLE 2.4.1

The primary material of example 1.4.1 is washed, filtered and dried at 180° C. A precursor material is achieved where particles have a core of LiMO$_2$ (M=Mn$_{0.4}$Ni$_{0.4}$Co$_{0.2}$) surrounded by a porous layer of cobalt oxohydroxide.

EXAMPLE 2.4.2

The primary material of example 1.4.2 is washed, filtered and dried at 180° C. A precursor material is achieved where particles have a core of LiMO$_2$ (M=Mn$_{0.4}$Ni$_{0.4}$Co$_{0.2}$) surrounded by a porous layer of oxohydroxide with M'=Co$_{2/3}$Mn$_{1/6}$Ni$_{1/6}$

EXAMPLE 2.5

The primary material of example 1.3.1 was ion exchanged in a solution of LiOH to remove the sulfate impurity. Then it was washed, filtered and dried at 180° C.

A precursor material is achieved, where particles have a core with composition Li[Co$_{0.8}$Mn$_{0.1}$Ni$_{0.1}$]O$_2$ respectively Li[Co$_{2/3}$(Mn$_{1/2}$Ni$_{1/2}$)$_{1/3}$]O$_2$ surrounded by a complete, thick layer of oxohydroxide with transition metal composition M=Mn$_{1/2}$Ni$_{1/2}$.

3. Preparation of Lithium Transition Metal Oxide Cathode Material

EXAMPLE 3.1

The precursor material of example 2.1 is mixed with Li$_2$CO$_3$, in a ratio Li:M=1.15:1 and a solid state reaction followed by sintering is performed at 850° C. for 15 h. At higher sintering temperature the spatial variation of transition metal stoichiometry would relax too much.

As a result a lithium transition metal oxide, having a layered crystal structure, and a spatially varying transition metal stoichiometry is achieved.

EXAMPLE 3.2

The precursor material of example 2.2 is mixed with Li$_2$CO$_3$ (Li:M 1.05:1) additionally, 0.6 mol Li$_2$SO$_4$ were added per 1 mol Na impurity. A solid state reaction was performed at 900° C. for 12 hours, followed by a wash and a second heating at 800° C.

During the solid state reaction, Li$_2$SO$_4$, reacts with the sodium impurity. X-ray diffraction indicated that the resulting salt was LiNaSO$_4$. The salt acts as sintering agent and it is removed by the wash.

As a result a lithium transition metal oxide, having a layered crystal structure, being very crystalline, and having a spatially varying transition metal stoichiometry is achieved.

EXAMPLE 3.3.1

The precursor material of example 2.3.1 is mixed with Li$_2$CO$_3$ (2.7 g Li$_2$CO$_3$ per 50 g precursor). A solid state reaction was made for 12 hours, the sintering temperature was 900° C. (sample 3.3.1A) respectively 850° C. (sample 3.3.1B).

Figure 8A:
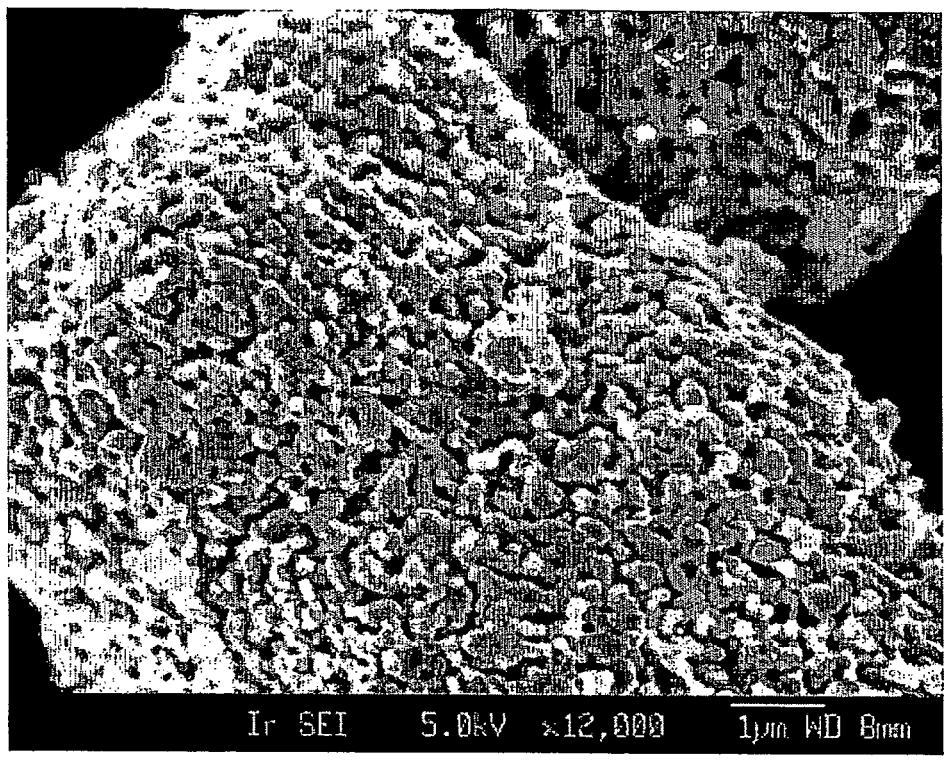
FIG. 8A shows FESEM micrograph of a typical particle of example 3.3.1 (sample 3.3.1A, sintered at 850° C.)
Figure 8B:
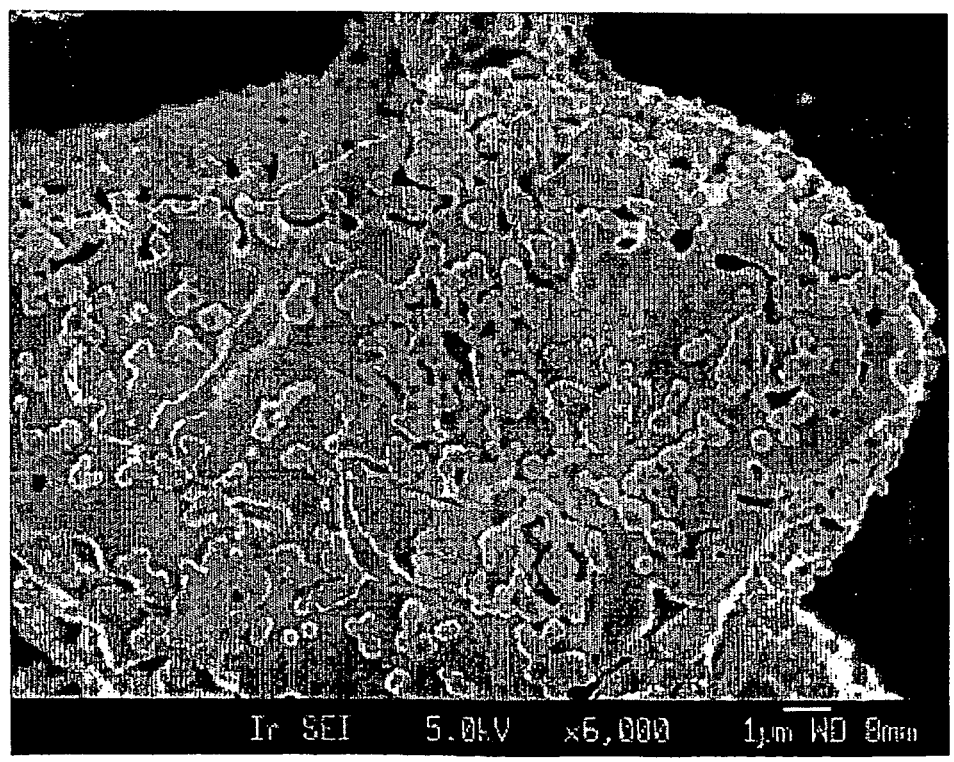
FIG. 8B shows FESEM micrograph of a typical particle of example 3.3.1 (sample 3.3.1B, sintered at 900° C.).

As a result a lithium transition metal oxide, having a layered crystal structure, and a spatially varying transition metal stoichiometry is achieved. Sample B, sintered at lower temperature has not only a stoichiometric variation; here also the morphology of the outer bulk (being slightly porous) differs from the morphology of the inner bulk (being dense). FIGS. 8A and 8B show FESEM micrographs of typical particles of sample 3.3.1A and 3.3.1B, respectively.

EDS quantitative elemental analysis was performed. X-ray diffraction pattern was obtained. A Rietveld refinement was made. Lattice constants and the unit cell volume was calculated. Data for unit cell volumina as function of composition in Li[Li$_x$(Mn$_{1/2}$Ni$_{1/2}$)$_{1-y}$Co$_y$]O$_2$ were used to estimate the transition metal stoichiometry. The results of the crystal structural analysis are consistent with results of the quantitative EDS elemental analysis. Result of the structural investigations show that a layered LiMO$_2$ is achieved, where the transition metal composition in the outer bulk differs significantly from the composition of the inner bulk.

The outer bulk dominantly contains a LiMO$_2$, M=(Mn$_{1/2}$Ni$_{1/2}$)$_{1-y}$Co$_y$ phase with a distribution of y, the average y≈0.4 (sample 3.3.1A) and y≈0.6 (sample 3.3.2). The inner bulk is dominantly a pure LiCoO$_2$ phase.

Figure 9:
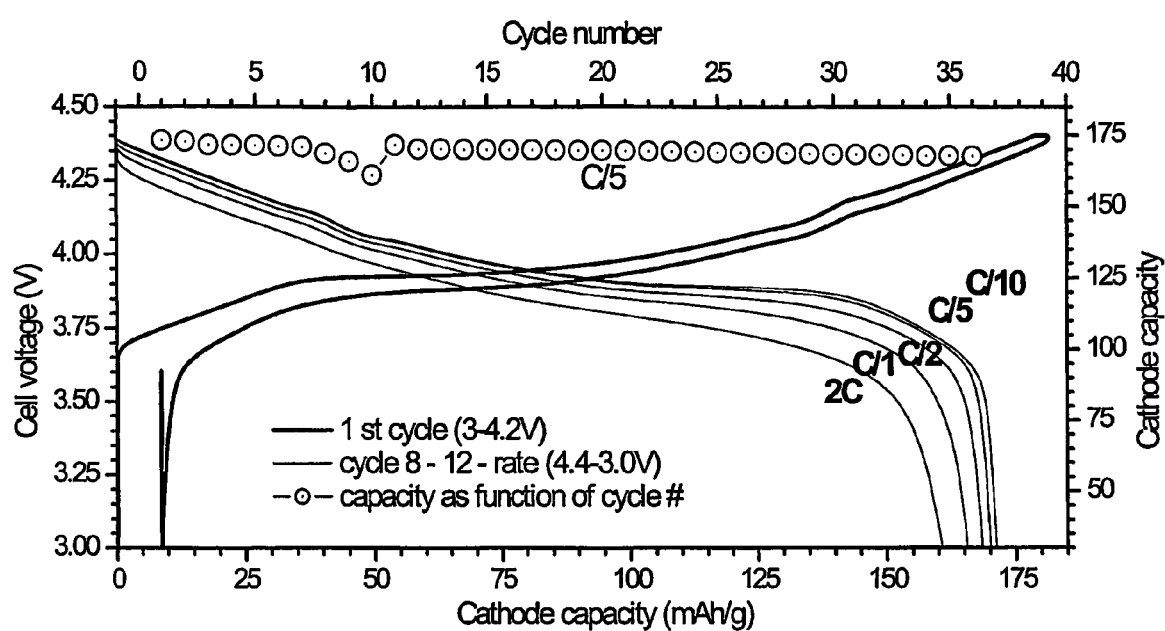
FIG. 9 shows grapes for electrochemical cycling (4.4-3V) of cathode material 3.3.1B.

The pH is 9.2, measured after immersing 2 g sample into 40 ml H$_2$O. FIG. 9 shows results of electrochemical cycling of the cathode material 3.3.1B. As anode Li-metal is used. Excellent electrochemical properties were achieved.

EXAMPLE 3.3.2

Figure 10A:
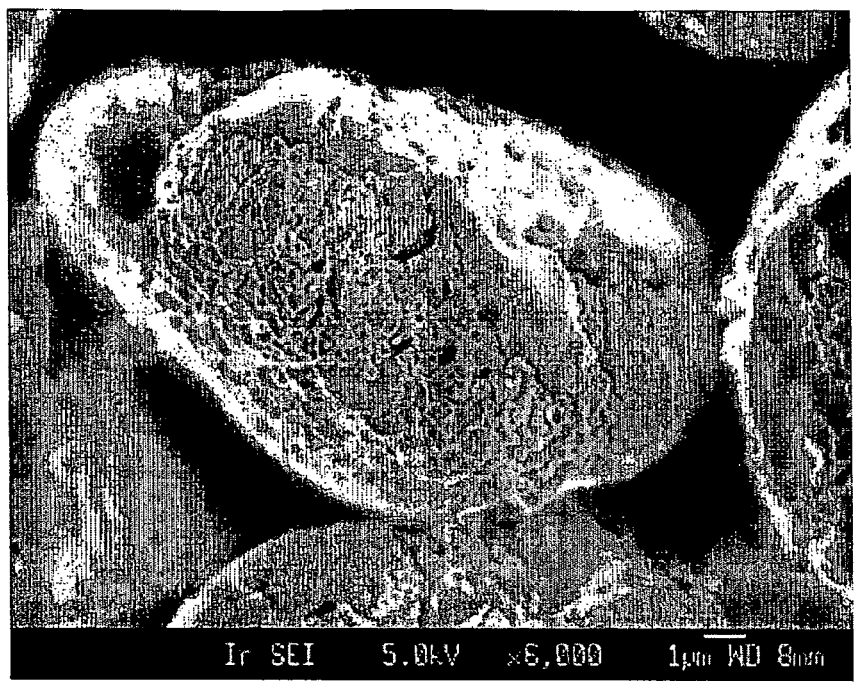
FIG. 10A shows FESEM micrograph of a typical particle of example 3.3.2, sintered at 950° C.
Figure 10B:
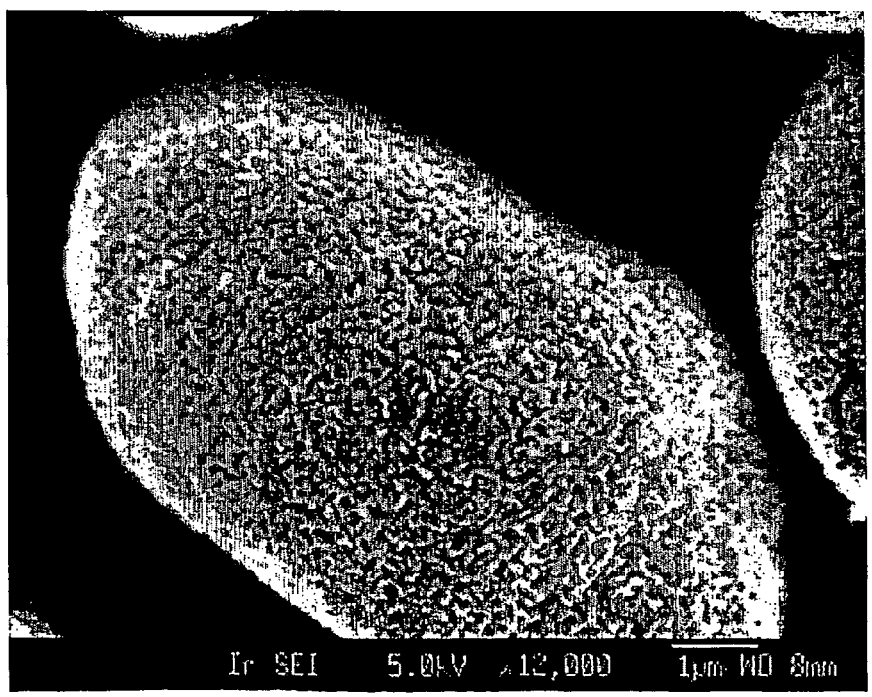
FIG. 10B shows FESEM micrograph of a typical particle of example 3.3.2, sintered at 850° C.

The precursor material of example 2.3.2 is mixed with Li$_2$CO$_3$ (2.35 g Li$_2$CO$_3$ per 33.3 g precursor). A solid state reaction was made for 12 hours, the sintering temperature was 950° C. for sample 3.3.2A and 850° C. for sample 3.3.2B As a result a lithium transition metal oxide, having a layered crystal structure, and a spatially varying transition metal stoichiometry is achieved. FIGS. 10A and 10B show FESEM micrographs of typical particles. At 950° C. compact particles are achieved, at 850° C. the outer bulk shows exhibits some porosity.

EDS quantitative elemental analysis was performed. The results confirm that the outer bulk has a significant different transition metal composition than the inner bulk.

EXAMPLE 3.3.3

The precursor material of example 2.3.3 is mixed with Li$_2$CO$_3$ and Li$_2$SO$_4$ (3.88 g Li$_2$CO$_3$ and 0.37 g Li$_2$SO$_4$ per 50 g precursor). A solid state reaction was made for 10 hours, the sintering temperature was 850° C. X-ray investigation indicated the sence of Li—Na—SO$_4$, acting as sintering agents. The sample was washed to remove the sodium and sulfate impurities. Then a second heat treatment, at 850° C. for 3 hours followed.

Figure 11:
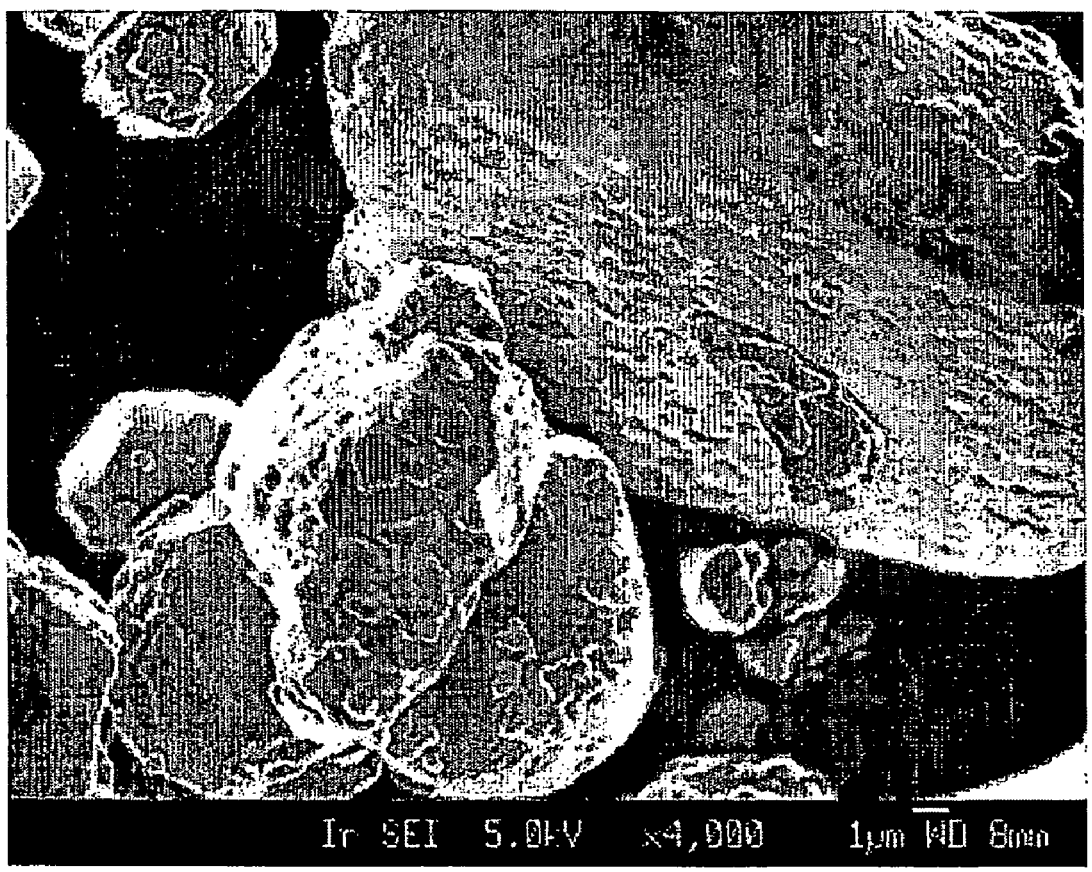
FIG. 11 show FESEM of a typical particle of the cathode of example 3.3.3 sintered at 850°.
Figure 12:
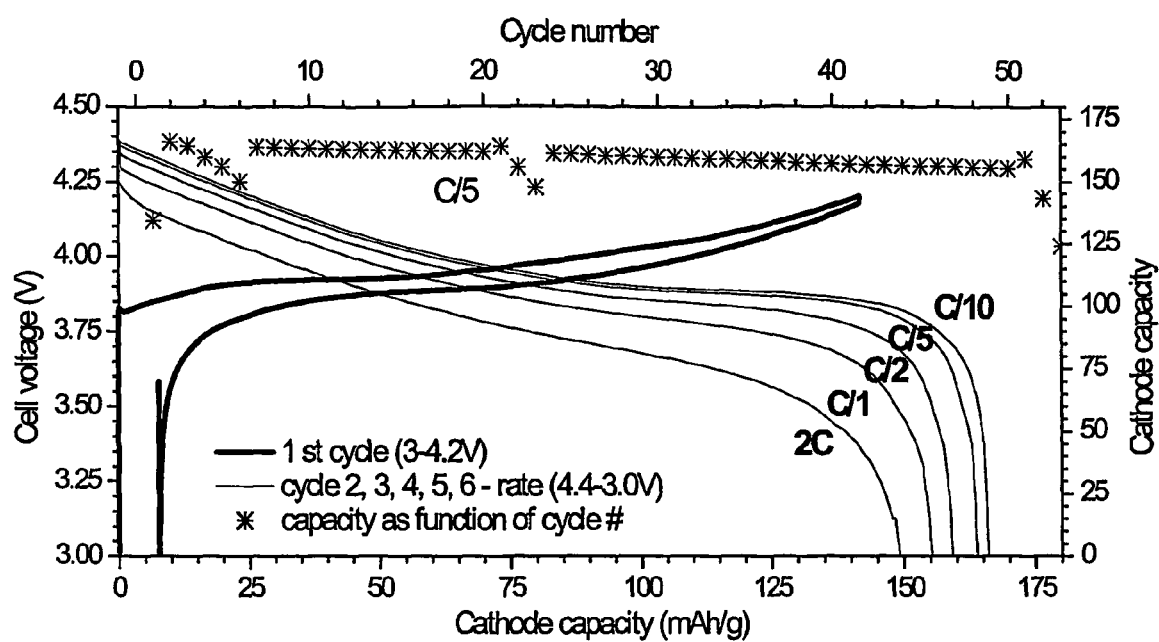
FIG. 12 shows grapes for electrochemical cycling (4.4-3V) of the cathode material of example 3.3.3.

FIG. 11 shows a FESEM micrograph of typical particles. Typical particles are compact, the powder density is high. FIG. 12 shows results of electrochemical testing. EDS quantitative elemental analysis was performed. The results confirm that the outer bulk has a significant different transition metal composition than the inner bulk.

EXAMPLE 3.3.5

The precursor material of example 2.3.4 is mixed with Li$_2$CO$_3$. 5.2 g Li$_2$CO$_3$ were added to 10 g precursor. A solid state reaction was made for 10 hours, the sintering temperature was 900° C.

EXAMPLE 3.4.1

The precursor material of example 2.4.1 is mixed with Li$_2$CO$_3$ (0.53 mol Li$_2$CO$_3$ per 1 mol precipitated Co). A solid state reaction is made for 12 hours, the sintering temperature was 900° C. As a result a lithium transition metal oxide, having a layered crystal structure, and a spatially significantly varying transition metal stoichiometry is achieved.

EXAMPLE 3.4.2

The precursor material of example 2.4.2 is mixed with Li$_2$CO$_3$ (0.53 mol Li$_2$CO$_3$ per 1 mol precipitated Co). A solid state reaction is made for 12 hours, the sintering temperature is 900° C. As a result a lithium transition metal oxide, having a layered crystal structure, and a spatially significantly varying transition metal stoichiometry is achieved.

EXAMPLE 3.5

The precursor materials of example 2.5 is mixed with Li$_2$CO$_3$ (2.0 g Li$_2$CO$_3$ per 33.3 g precursor). A solid state reaction is made for 12 hours, the sintering temperature is 900° C.

As a result a lithium transition metal oxides, having a layered crystal structure, and a spatially significantly varying transition metal stoichiometry are achieved.

The forgoing embodiments are merely exemplary and are not to be construed as limiting the present invention. The description of the present invention is intended to be illustrative and not to limit the scope of the claims. Many alternatives, modifications, and variations will be apparent to those skilled in the art.

The invention claimed is:

1. A powderous transition metal compound comprising:
   at least 85% w/w of transition metal and oxygen,
   wherein the powder includes particles, which have a significant spatial change of transition metal stoichiometry, having an average transition metal composition M=(Mn$_{1-u}$Ni$_u$)$_{1-y}$Co$_y$ where 0.2<u<0.7 and 0.1<y<0.9,
   wherein the average transition metal composition of cobalt as well as manganese as well as nickel in the outer bulk differ by at least 10% in stoichiometry from the average transition metal composition of the inner bulk,
   the inner bulk being specified as a region around the center of the particle including about 50% of the total number of cobalt, nickel and manganese atoms of the particle.

2. The powderous transition metal compound according to claim 1, having average transition metal composition M=(Mn$_{1-u}$Ni$_u$)$_{1-y}$Co$_y$, where 0.4<u<0.65 and 0.2<y<0.9,
   wherein the average transition metal compositions of cobalt as well as manganese as well as nickel in the outer bulk differ by at least 15% in stoichiometry from the average transition metals of the inner bulk.

3. The powderous transition metal compound according to claim 1, having average transition metal composition M=(Mn$_{1-u}$Ni$_u$)$_{1-y}$Co$_y$, wherein 0.4<u<0.65 and 0.2<y<0.9,
   wherein the powder consists of particles which have the same crystal structure everywhere in the bulk of the particle.

4. The powderous transition metal compound according to claim 1, having average transition metal composition M=(Mn$_{1-u}$Ni$_u$)$_{1-y}$Co$_y$, where 0.4<u<0.65 and 0.2<y<0.9,
   wherein an inner bulk is a lithium transition metal oxide with layered crystal structure with space group r-3m.

5. A powderous lithium metal oxide, wherein at least 90% of the metal is transition metal with an average transition metal composition M=(Mn$_{1-u}$Ni$_u$)$_{1-y}$Co$_y$, where 0.4<u<0.65 and 0.2<y<0.9,
   the powder consisting of particles which have
   the same layered crystal structure with space group r-3m everywhere in the bulk of typical particles
   a significant spatial change of transition metal stoichiometry, where the average transition metal compositions of cobalt as well as manganese as well as nickel in the outer bulk differ by at least 10% in stoichiometry from the average transition metal compositions of the inner bulk,
   the inner bulk being specified as a region around the center of the particle including about 50% of the total number of cobalt, nickel and manganese atoms of the particle.

6. The powderous lithium metal oxide according to claim 5, wherein at least 95% of the metal is transition metal with average composition $M=(Mn_{1-u}Ni_u)_{1-y}Co_y$ where $0.4<u<0.65$, and $0.25<y<0.45$ or $0.65<y<0.85$,
the powder consisting of particles which have continuous spatial change of transition metal stoichiometry.

7. The powderous lithium metal oxide according to claim 6, wherein the transition metal has average composition $M=(Mn_{1-u}Ni_u)_{1-y-z}Co_y$ where $0.4<u<0.65$ and $0.65<y<0.85$,
wherein the inner bulk has an average transition metal composition $M=(Mn_{1-u}Ni_u)_{1-y}Co_y$ where $0 \leq u \leq 1$ and $0.75 \leq y \leq 1$.

8. A method for preparing powderous transition metal compounds according to claim 1, comprising at least one precipitation reaction,
wherein at least one solution of dissolved transition metal salt and at least one solution of dissolved hydroxide of carbonate salts are added to particles acting as seeds; dissolved transition metal cations and dissolved hydroxide or carbonate anions form a solid precipitate; and the precipitate forms a layer covering the seed particles,
the precipitate having a transition metal composition M2, which differs from the composition M1 of the seed particles by at least 10%.

9. The method according to claim 8, wherein the precipitate has a transition metal composition $M2=Mn_{1-a-b}Ni_aCo_b$—, which differs significantly from the composition $M1=Mn_{1-a'-b'}Ni_{a'}Co_{b'}$ of the seed particles, significantly being defined that the value $N_i/A_i>0.1$, in which $N_i$ is the difference of averaged local concentrations between in the inner bulk and in the outer bulk for each component $i$ and $A_i$ is the concentration of the component $i$ averaged over the whole bulk, wherein $i$ is chosen from Co, Mn and Ni.

10. The method according claim 9, wherein the seed particles are a lithium metal oxide where at least 95% of the metal is transition metal with average composition $M=(Mn_{1-u}Ni_u)_{1-y}Co_y$ where $0.4<u<0.65$ and $0 \leq y \leq 1.0$ having a layered crystal structure with space group r-3m.

11. A method according claim 10, where the seed particles are a lithium metal oxide where at least 95% of the metal is transition metal with average composition $M=(Mn_{1-u}Ni_u)_{1-y}Co_y$ where $0.4<u<0.65$ and $0.75 \leq y \leq 1.0$ having a layered crystal structure with space group r-3m.

12. The method according to claim 8, wherein the precipitate further includes at least one selected from the group consisting of anions chosen from $SO_4^{2-}$, $Cl^-$, $F^-$ and cations chosen from $Na^+$, $K^+$, $Li^+$, and the total concentration of these anions and cations exceed 0.01 mol per 1 mol transition metal of the precipitate.

13. The method according to claim 12, wherein the content of the anions and cations in the precipitate is modified by an ion exchange reaction, following after the precipitation reaction.

14. A method for preparing powderous lithium transition metal compounds according to claim 1, comprising:
at least one precipitation reaction,
wherein at least one solution of dissolved transition metal salt and at least one solution of dissolved hydroxide of carbonate salts are added to particles acting as seeds; dissolved transition metal cations and dissolved hydroxide or carbonate anions form a solid precipitate; and the precipitate forms a layer covering the seed particles, the precipitate having a transition metal composition M2, which differs from the composition M1 of the seed particles by at least 10%;
a heat treatment between 110-350° C. to modify the precipitate; and
a solid state reaction of the modified precipitate with a source of lithium.

15. The method according to claim 14 to prepare powderous lithium transition metal compounds,
wherein at least 90% of the metal is transition metal with average composition $M=(Mn_{1-u}Ni_u)_{1-y}Co_y$ where $0.4<u<0.65$ and $0.2<y<0.9$,
the powder consisting of particles which have
the same layered crystal structure with space group r-3m everywhere in the bulk of typical particles
a significant spatial change of transition metal stoichiometry, where the average transition metal compositions of cobalt as well as manganese as well as nickel in the outer bulk differ by at least 10% from the average transition metal compositions of the inner bulk,
the inner bulk being specified as a region around the center of the particle including about 50% of the total number of cobalt, nickel and manganese atoms of the particle; and
wherein the lithium transition metal compound basically is free of further anions and cations including $Cl^-$, $SO_4^{2-}$, $Na^+$ and $K^+$, by removing these anions and cations either by an ion exchange reaction after the precipitation reaction, or by a washing after the solid state reaction.

16. A rechargeable lithium battery comprising: a powderous lithium transition metal oxide according to claim 5.

* * * * *